US008662072B2

(12) United States Patent
Butler et al.

(10) Patent No.: US 8,662,072 B2
(45) Date of Patent: Mar. 4, 2014

(54) SOLAR COLLECTOR

(75) Inventors: Barry L. Butler, Solona Beach, CA (US); Roger L. Davenport, Oceanside, CA (US); John E. Nemazi, Bloomfield Hills, MI (US)

(73) Assignee: Steven Polk, West Bloomfield, MI (US)

( * ) Notice: Subject to any disclaimer, the term of this patent is extended or adjusted under 35 U.S.C. 154(b) by 161 days.

(21) Appl. No.: 13/122,237

(22) PCT Filed: Oct. 1, 2009

(86) PCT No.: PCT/US2009/059283
§ 371 (c)(1),
(2), (4) Date: Apr. 1, 2011

(87) PCT Pub. No.: WO2010/039999
PCT Pub. Date: Apr. 8, 2010

(65) Prior Publication Data
US 2011/0179791 A1      Jul. 28, 2011

Related U.S. Application Data

(60) Provisional application No. 61/101,704, filed on Oct. 1, 2008, provisional application No. 61/175,509, filed on May 5, 2009.

(51) Int. Cl.
*F24J 2/40* (2006.01)

(52) U.S. Cl.
USPC ........... 126/607; 126/601; 126/651; 126/684; 126/696; 60/641.5

(58) Field of Classification Search
USPC ......... 126/584, 606, 601, 607, 651, 684, 696; 60/641.15
See application file for complete search history.

(56) References Cited

U.S. PATENT DOCUMENTS

| 811,274 A | 1/1906 | Carter |
|---|---|---|
| 4,116,541 A | 9/1978 | Weiss |

(Continued)

FOREIGN PATENT DOCUMENTS

| CN | 85202331 U | 4/1986 |
|---|---|---|
| GB | 1333343 | 10/1973 |

(Continued)

OTHER PUBLICATIONS

First Office Action; State Intellectual Property Office of China; Sep. 19, 2012; 5 Pages.

(Continued)

*Primary Examiner* — Avinash Savani
(74) *Attorney, Agent, or Firm* — Brooks Kushman P.C.

(57) ABSTRACT

A solar collector is provided with a reflective panel assembly that is supported by a frame and pivots about a first horizontal axis. The panel assembly is configured for reflecting sunlight to a common focal point, and includes a central panel and a pair of outer panels each pivotally coupled to the central panel and configured for folding over the central panel. A collector assembly is mounted relative to the frame and pivotal about a second horizontal axis. The collector assembly is configured for collecting solar energy and includes a receiver that is positioned at the focal point. The receiver is configured for extracting energy from the reflected sunlight. The solar collector may also include a four-bar linkage assembly for supporting the panel assembly and the collector assembly during movement from a collapsed position and a partially extended position.

19 Claims, 15 Drawing Sheets

(56) References Cited

U.S. PATENT DOCUMENTS

| | | | |
|---|---|---|---|
| 4,159,712 A * | 7/1979 | Legg | 126/584 |
| 4,195,775 A | 4/1980 | Pitts | |
| 4,256,088 A | 3/1981 | Vindum | |
| 4,312,326 A * | 1/1982 | Johnson, Jr. | 126/606 |
| 4,355,628 A | 10/1982 | Watts | |
| 4,398,391 A * | 8/1983 | English, Jr. | 60/641.15 |
| 4,408,595 A | 10/1983 | Broyles et al. | |
| 4,457,297 A | 7/1984 | Sobczak et al. | |
| 4,566,432 A * | 1/1986 | Sobczak et al. | 126/606 |
| 4,583,521 A | 4/1986 | Ciambella et al. | |
| 4,656,996 A | 4/1987 | Aharon | |
| 4,999,059 A | 3/1991 | Bagno | |
| 5,758,938 A * | 6/1998 | Osterwisch | 353/3 |
| 5,956,191 A | 9/1999 | Blackmon et al. | |
| 5,969,501 A | 10/1999 | Glidden et al. | |
| 6,067,982 A | 5/2000 | Harrison | |
| 6,123,067 A | 9/2000 | Warrick | |
| 6,396,239 B1 | 5/2002 | Benn et al. | |
| 6,485,152 B2 | 11/2002 | Wood | |
| 6,513,326 B1 | 2/2003 | Maceda et al. | |
| 6,662,801 B2 | 12/2003 | Hayden et al. | |
| 6,701,708 B2 | 3/2004 | Gross et al. | |
| 6,931,848 B2 | 8/2005 | Maceda et al. | |
| 7,105,940 B2 | 9/2006 | Weesner et al. | |
| 7,464,703 B2 | 12/2008 | Aaron | |
| 7,878,192 B2 * | 2/2011 | Larsen | 126/696 |
| 2009/0114213 A1 | 5/2009 | McDonald et al. | |
| 2012/0085387 A1 | 4/2012 | French, Sr. | |

FOREIGN PATENT DOCUMENTS

| | | |
|---|---|---|
| JP | 2000243983 A | 9/2000 |
| WO | 8300733 A1 | 3/1983 |
| WO | 03006894 A1 | 1/2003 |
| WO | 2005088209 A1 | 9/2005 |

OTHER PUBLICATIONS

Patent Cooperation Treaty, The International Search Report and the Written Opinion of the International Searching Authority for the corresponding PCT Application No. PCT/US2009/059283 mailed May 7, 2010.

Richard Caputo et al., "The Use of Energy Parks' to Balance Renewable Energy in the San Diego Region," ASES Solar Symposium, Jul. 2007.

Thomas Mancini et al., "Dish-Stirling Systems: An Overview of Development and Status," Journal of Solar Energy Engineering, ASME, May 2003, vol. 125.

* cited by examiner

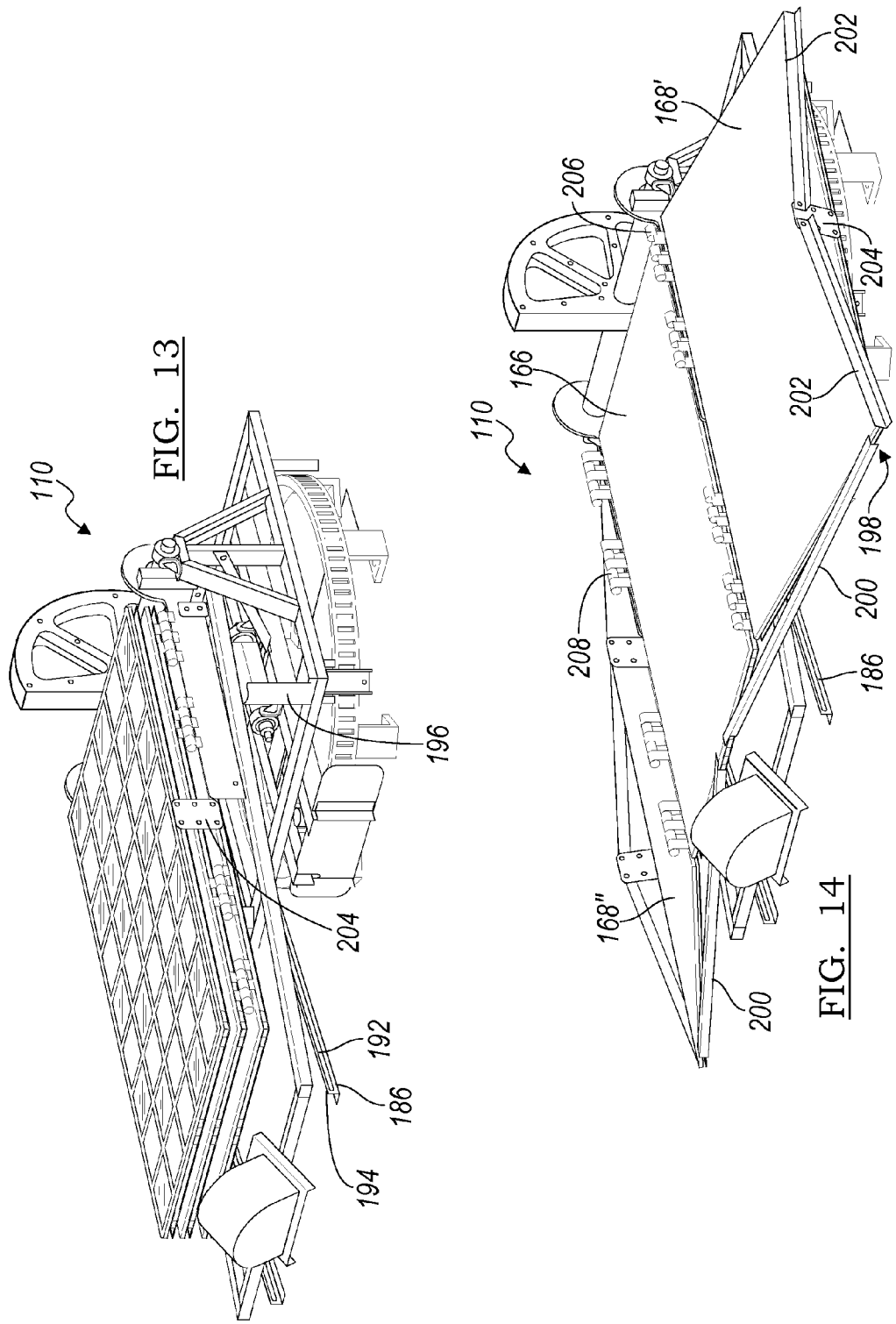

US 8,662,072 B2

SOLAR COLLECTOR

CROSS-REFERENCE TO RELATED APPLICATIONS

This application claims the benefit of U.S. provisional application Ser. No. 61/101,704 filed Oct. 1, 2008, and U.S. provisional application Ser. No. 61/175,509 filed May 5, 2009, the disclosures of which are incorporated by reference herein.

BACKGROUND

1. Technical Field

Embodiments of the invention relate to a solar collector for collecting energy from the sun.

2. Background Art

Solar collectors are generally provided for collecting energy from the sun. Solar collectors typically include a reflective surface and a collector assembly coupled together for receiving solar energy and using the energy for heating a fluid. The reflective surface focuses sunlight at a focal point. A collector assembly includes a receiver positioned at the focal point. The collector assembly circulates fluid through the receiver to extract energy. The circulating fluid is heated within the receiver. Solar energy is harvested from this heated fluid, and converted into other forms of energy, such as electricity. Alternatively some solar collectors position a heat engine adjacent to the receiver for harvesting solar energy.

SUMMARY

In at least one embodiment, a solar collector is provided with a frame coupled to a base for rotating about a vertical axis. A reflective panel assembly is supported by the frame and pivotal about a first horizontal axis relative to the frame. The panel assembly is configured for reflecting sunlight to a common focal point, and includes a central panel, and a pair of outer panels each pivotally coupled to opposing lateral edges of the central panel and configured for folding over the central panel. A collector assembly is mounted relative to the frame and pivotal about a second horizontal axis that is parallel to the first horizontal axis. The collector assembly is configured for collecting solar energy and includes a receiver that is positioned adjacent the focal point and configured for extracting energy from the reflected sunlight. The collector assembly includes at least one member for supporting the receiver and for facilitating energy communication through the receiver.

In another embodiment, a solar collector is provided with a frame rotationally coupled to a base. A reflective panel assembly is configured for reflecting sunlight at a focal point. A collector assembly is pivotally coupled to the frame, and includes a receiver positioned at the focal point for receiving the reflected sunlight. A four-bar linkage assembly is formed by the frame and a series of linkages coupled to one another for supporting the panel assembly and the collector assembly during movement between a collapsed position and a partially extended position

BRIEF DESCRIPTION OF THE DRAWINGS

FIG. 13 is another front perspective view of the solar collector of FIG. 10, illustrated in a collapsed position;

FIG. 14 is another front perspective view of the solar collector of FIG. 10, illustrated in a stowed position;

DETAILED DESCRIPTION OF EMBODIMENTS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
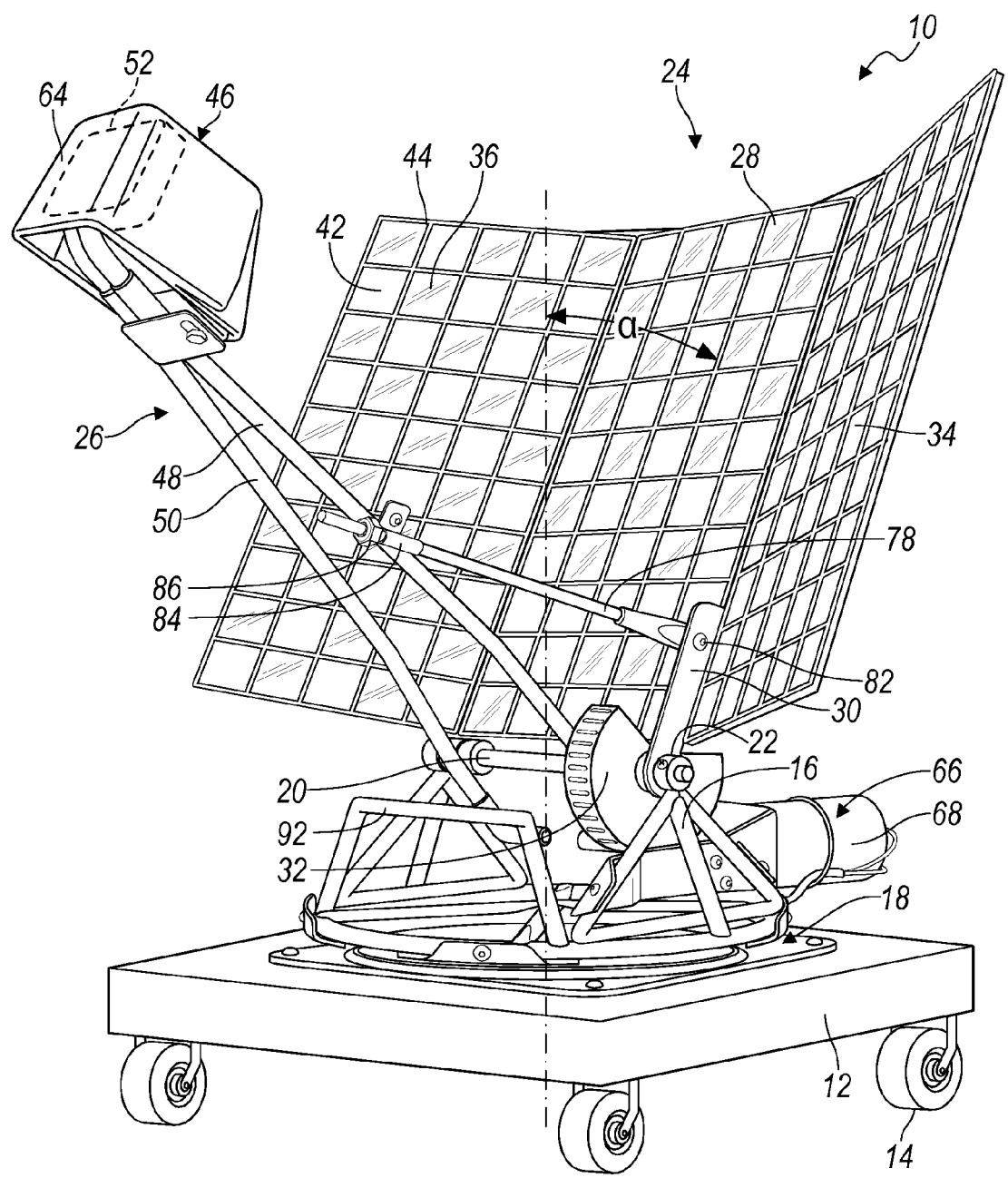
FIG. 1 is a front perspective view of a solar power collector according to an embodiment of the present invention, illustrated in an extended position with an expanded reflective panel assembly.

With reference to FIG. 1, a solar collector is illustrated in accordance with an embodiment of the present invention and is referenced generally by numeral 10. The solar collector 10 is fixed to a base 12. The base 12 is shown as being generally polygonal, as a platform in the depicted embodiment. The base 12 includes a series of wheels 14 that contact the ground to allow the solar collector 10 to be easily transported. Alternate embodiments of the solar collector 10 are envisioned, where the base 12 is a trailer to be pulled by another vehicle.

A frame 16 is rotatably attached to the base 12 by a bearing assembly 18. A lower race of the bearing assembly 18 is fixed to the base 12, the lower race contains a plurality of bearings. The frame 16 is connected to an upper race of the bearing assembly 18. The frame 16 and the upper race rotate relative to the base 12 and lower race by utilizing the bearings. The depicted bearing assembly 18 includes ball bearings, however alternative embodiments are envisioned using roller bearings, needle bearings or the like. Alternative embodiments of the solar collector 10, envision a series of casters for rotating the frame 16 about the base 12. Additionally a gimbal assembly, such as that of U.S. application Ser. No. 11/725,366, which is herein incorporated by reference, could be utilized to allow the frame to rotate.

The frame 16 includes a transverse axle 20, supported by a pair of axle supports 22. A reflective panel assembly 24 and a collector assembly 26, pivot about the transverse axle 20.

Figure 3:
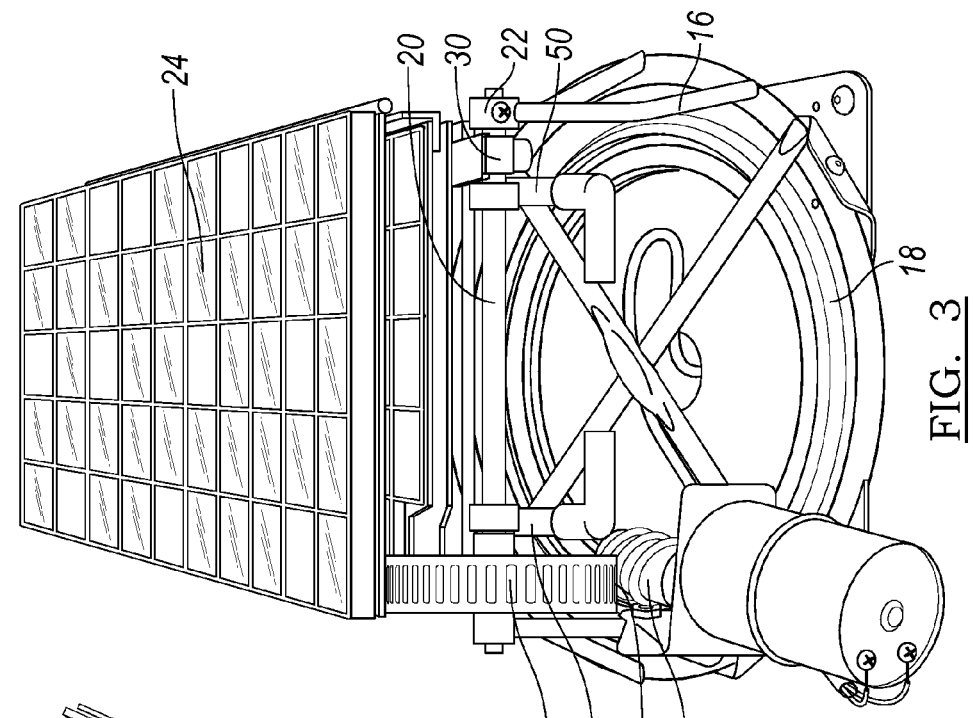
FIG. 3 is a rear perspective view of the solar power collector of FIG. 1, illustrated in a collapsed position.
Figure 2:
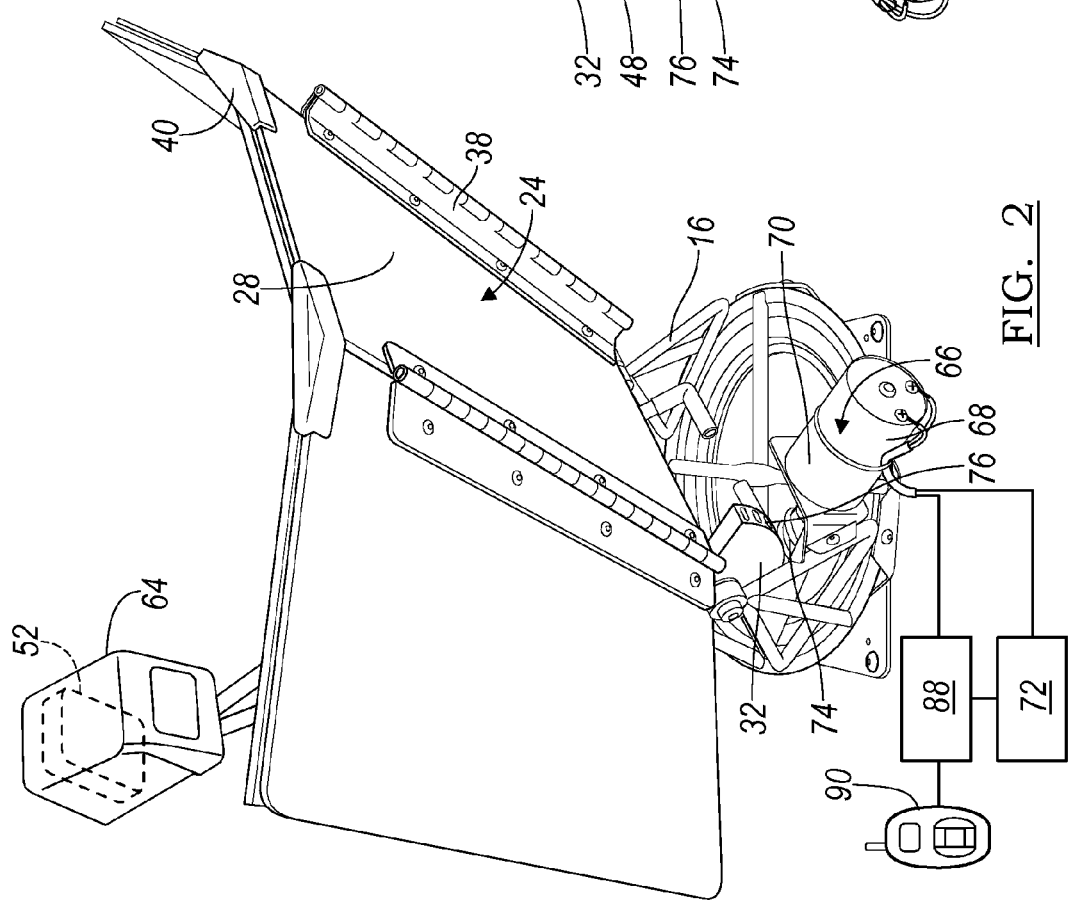
FIG. 2 is rear perspective view of the solar power collector of FIG. 1.

Referring to FIGS. 1-3, the reflective panel assembly 24 shown in the depicted embodiment includes three panels, all of generally the same size. An embodiment of the solar collector 10, includes panels that are each generally ten feet wide and fifteen feet in length. The reflective panel assembly 24 includes a central panel 28, that is attached to a bracket 30. The bracket 30 is affixed to a sector 32 and pivotally connected to the transverse axle 20. A first outer panel 34 and a second outer panel 36 are each attached to the central panel 28 by a pair of hinges 38. The two outer panels 34 and 36 are angled inward toward the collector assembly 26. A pair of joints 40 lock the central panel 28 to each of the outer panels 34 and 36 so that a focused orientation of the panel assembly 24 is maintained. An alternate embodiment of the reflective panel assembly 24 includes additional smaller reflective panels (not shown) extending from the existing panels 28, 34 and 36 to further expand the reflective panel assembly 24.

Each panel 28, 34 and 36, contains an array of reflective facets 42, organized in a tessellated pattern and embedded in a structure 44. An embodiment of the panel assembly 24, includes the structure 44 made of aluminum. A robot may be employed to attach and align each facet 42 in the structure 44 of the panels 28, 34 and 36. The robot is programmed to orient each facet 42, to reflect sunlight at a common focal point.

Alternatively, another embodiment for the method of manufacturing the reflective panel assembly 24 is envisioned where each panel is molded as a single unit, incorporating the contour of each facet. First a fiberglass pattern of a mirror image of each panel can be created using a robot. This pattern may then be used to create a mold of each panel. The panel is coated with a thin reflective film. This process will improve the reflective efficiency of the panel assembly from approximately ninety-two percent for individual facets to ninety-five to ninety-six percent for a single piece thin film panel.

The collector assembly 26 includes a receiver 46 that is supported by a pair of tubes; an inlet tube 48 and an outlet tube 50. As mentioned above, light is reflected by the panel assembly 24 at a common focal point. The receiver 46 is positioned at the focal point. The tubes 48 and 50 also provide a path for fluid to travel between the base 12 and the receiver 46.

Figure 4:
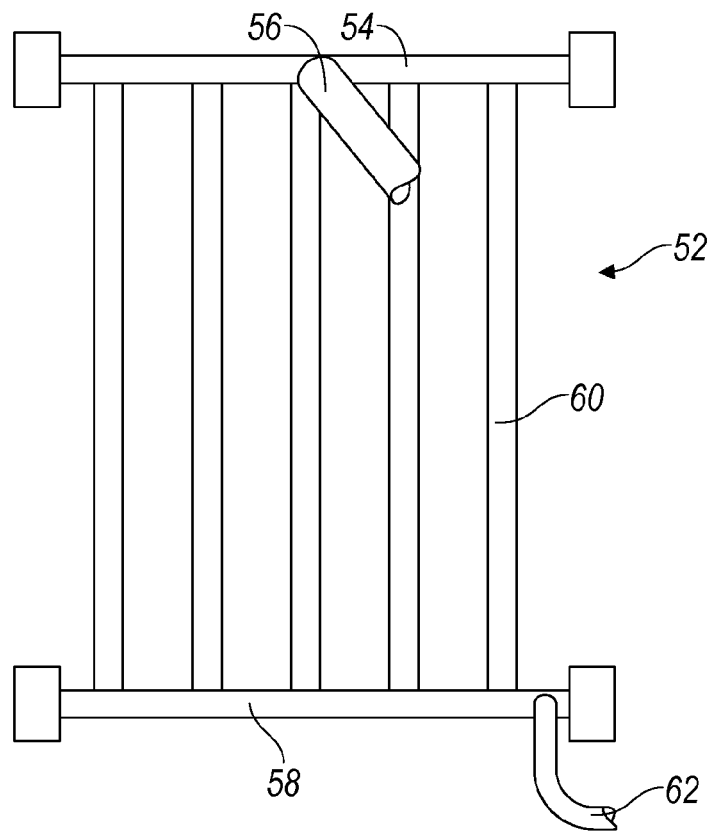
FIG. 4 is a front view of an absorber of the solar power collector of FIG. 1.

Referring to FIGS. 1-4, the receiver 46 includes an absorber 52, for circulating fluid while the fluid is heated by the focused sunlight. Fluid enters an upper header 54 of the absorber 52 from inlet tube 48 at inlet port 56. Fluid travels from the upper header 54 to the lower header 58 through a series of generally upright transport tubes 60. With reference to FIGS. 1 and 4, the heated fluid exits the absorber 52 at an outlet port 62 and travels back toward the base 12 through the outlet tube 50. The absorber 52 is enclosed by a shell 64 to retain heat. An alternate embodiment includes at least one serpentine tube (not shown) replacing the vertical transport tubes 60.

The shell 64 may provide a shroud for preventing the bright focused sunlight from harming the eyes of a bystander. Looking into a bright concentrated light source or image (e.g., the sun or an arc during welding) may harm a bystander's eyes. The sunlight that is reflected by the panel assembly 24 at the absorber 52 of the receiver 46 may create such a bright focused light. By extending the shell 64 towards the panel assembly 24, the area is limited from which a bystander may view the bright light that is focused on the absorber 52. Additionally, the shell 64 contemplates the addition of a funnel or "flux-stuffer" (not shown) positioned within the shell for further focusing the reflected sunlight upon the absorber 52.

A fluid supply and pump (not shown) are connected to the solar collector 10 at the inlet tube 48. The pump circulates the fluid through the collector assembly 26. Additionally, the outlet tube 50 is connected to a heat exchanger (not shown) for converting the heated fluid into other forms of energy.

The solar collector 10 collects sunlight and converts it into energy, in the form of a heated fluid. To optimize output energy, the solar collector 10 optimizes input sunlight by adjusting to track the relative position of the sun. A pitch actuator 66 adjusts the azimuth angle $\alpha$ of the solar collector 10 relative to the sun.

Referring to FIGS. 2 and 3, the pitch actuator 66 is mechanically coupled to the panel assembly 24. The pitch actuator 66 rotates the panel assembly 24 about the transverse axle 20 of the frame 16. The pitch actuator 66 includes a direct current motor 68 coupled to a transmission 70. The direct current motor 68 receives electrical power from a battery 72. The transmission 70 includes an enclosed gear train coupled to a wormset 76. The wormset 76 includes a screw 74, meshing with the sector 32. The sector 32 rotates about the transverse axle 20. The sector 32 is attached to the central panel 28, whereby as the sector 32 is driven by the pitch actuator 66, the panel assembly 24 pivots about the transverse axle 20. Alternate embodiments of the pitch actuator 66 are envisioned that include sensors to indicate the azimuth angle $\alpha$.

With reference to FIG. 1, as mentioned above, the reflected light is focused on the receiver 46. The position of the collector assembly 26 relative to the panel assembly 24, is maintained by a strut 78. The strut 78 is pivotally attached to the bracket 30, by a pin 82. The bracket 30 is fixed to the sector 32 and extends from the transverse axle 20, between the central panel 28 and the first outer panel 34. The distal end of the strut 78 is attached to an intermediate portion of the inlet tube 48 by a strut bushing 84 for translation within the bushing 84. An end stop 86 is fixed to the strut 78, distally located from the strut bushing 84 for locking the relative position between the collector assembly 26 and the panel assembly 24. Therefore as the panel assembly 24 pivots, the strut 78 allows the collector assembly 26 to follow the panel assembly's 24 travel.

Alternate embodiments of the solar collector 10 include a rotation actuator (not shown) for rotating the frame 16. Additionally sensors are contemplated to indicate the angular position of the frame.

Referring to FIG. 2, the solar collector 10, includes a controller 88. The controller 88 uses an algorithm to determine the position of the sun relative to the current position of the solar collector 10. When the controller 88 determines that the solar collector 10 is not properly aligned with the sun, the controller communicates with both the pitch actuator 66 and the rotation actuator, controlling them to adjust as needed to align with the sun. The algorithm uses the geographic position of the solar collector 10, along with the present date and time to calculate the position of the sun relative to the solar collector 10. Alternate embodiments envision the controller 88, communicating with sensors of the solar collector to determine the current position, for example sensors indicating the azimuth angle α and the angular position of the frame.

According to one embodiment, the solar collector 10 includes a cell phone diagnostic system 90 in communication with the controller 88. The diagnostic system 90 provides periodic checks of the solar collector 10. Additionally, the diagnostic system 90 allows the user to communicate with the solar collector 10 remotely.

Figure 5:
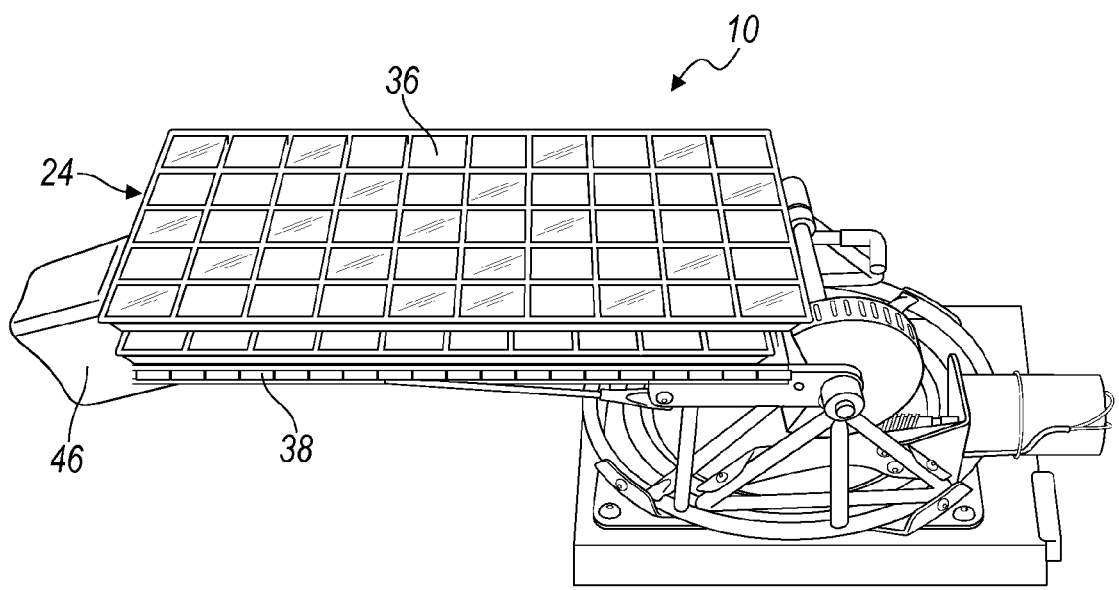
FIG. 5 is a side perspective view of the solar power collector of FIG. 1, illustrated in the collapsed position.

With reference to FIGS. 5-8, the solar collector 10 of the depicted embodiment is designed to be transported. During transport, the solar collector 10 collapses into a collapsed position, as illustrated in FIG. 5. In this collapsed position, the two outer panels 34 and 36, are folded about their hinges 38, such that the three panels 28, 34 and 36 are stacked on top of each other. The inlet and outlet tubes 48 and 50, are longer than the length of the panel assembly 24, which allows the receiver 46 to be positioned beyond the panel assembly 24 when the solar collector 10 is in the collapsed position.

Figure 6:
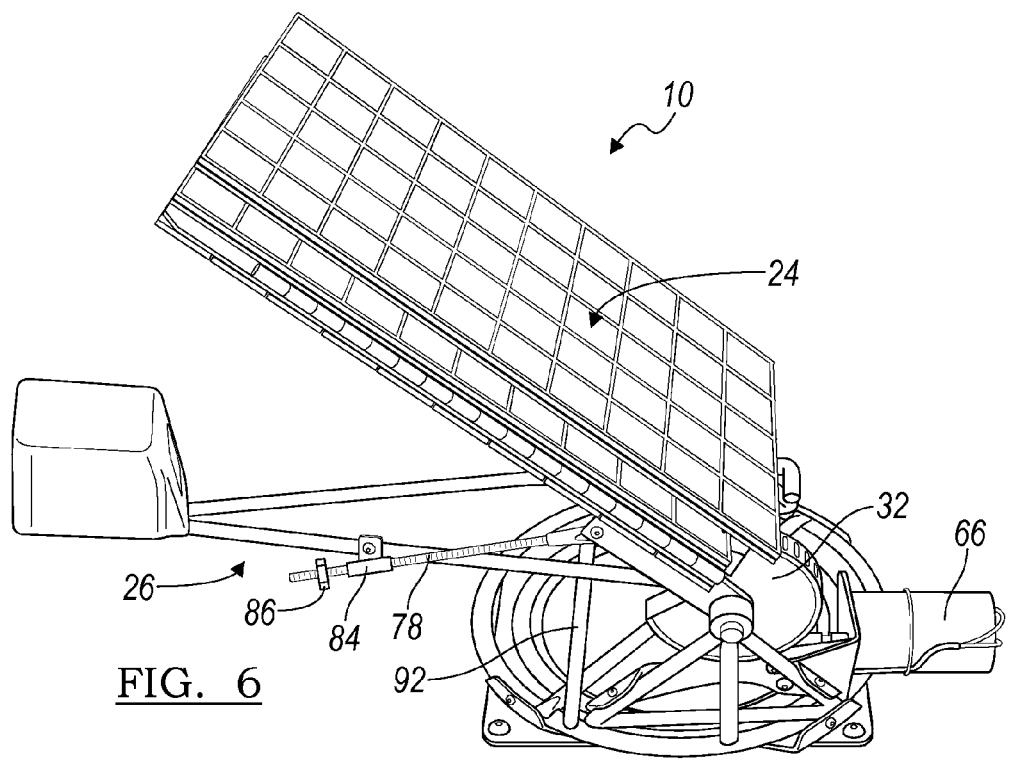
FIG. 6 is another side perspective view of the solar power collector of FIG. 1, illustrated in an intermediate position.
Figure 7:
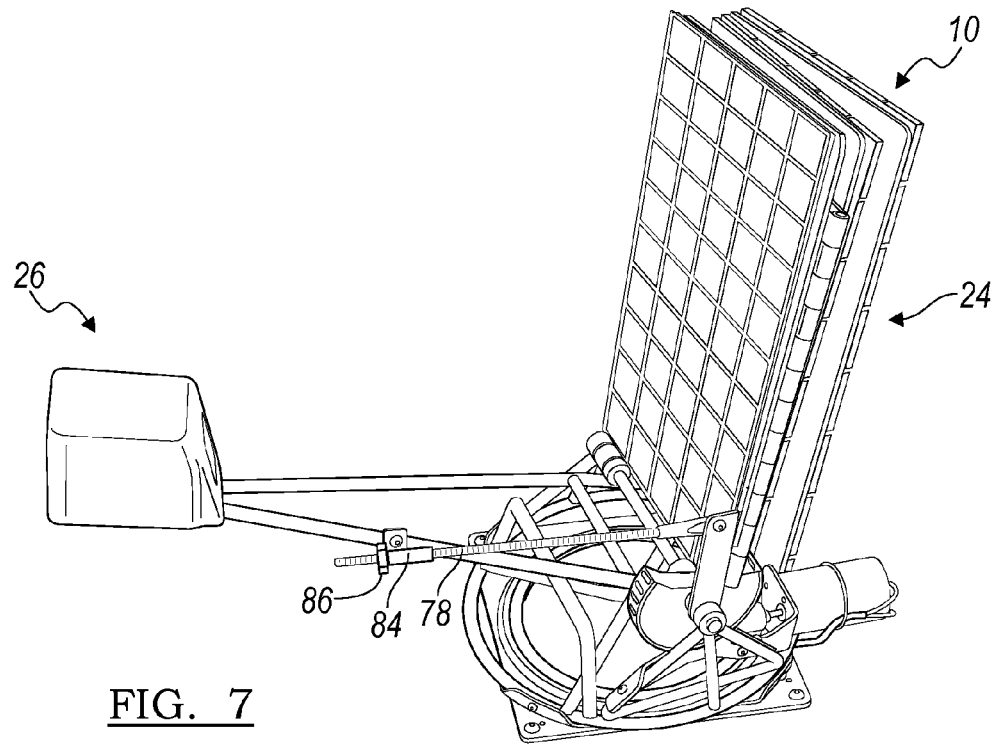
FIG. 7 is another side perspective view of the solar power collector of FIG. 1, illustrated in the extended position with a folded reflective panel assembly.

FIG. 6 illustrates the solar collector 10 in an intermediate position, as it transitions from the collapsed position of FIG. 5 towards the extended position shown in FIG. 7. The pitch actuator 66 drives the sector 32 extending the panel assembly 24. The collector assembly 26 remains resting on a frame brace 92 until the panel assembly 24 has pivoted far enough that the end stop 86 on the strut 78 contacts the strut bushing 84.

Figure 8:
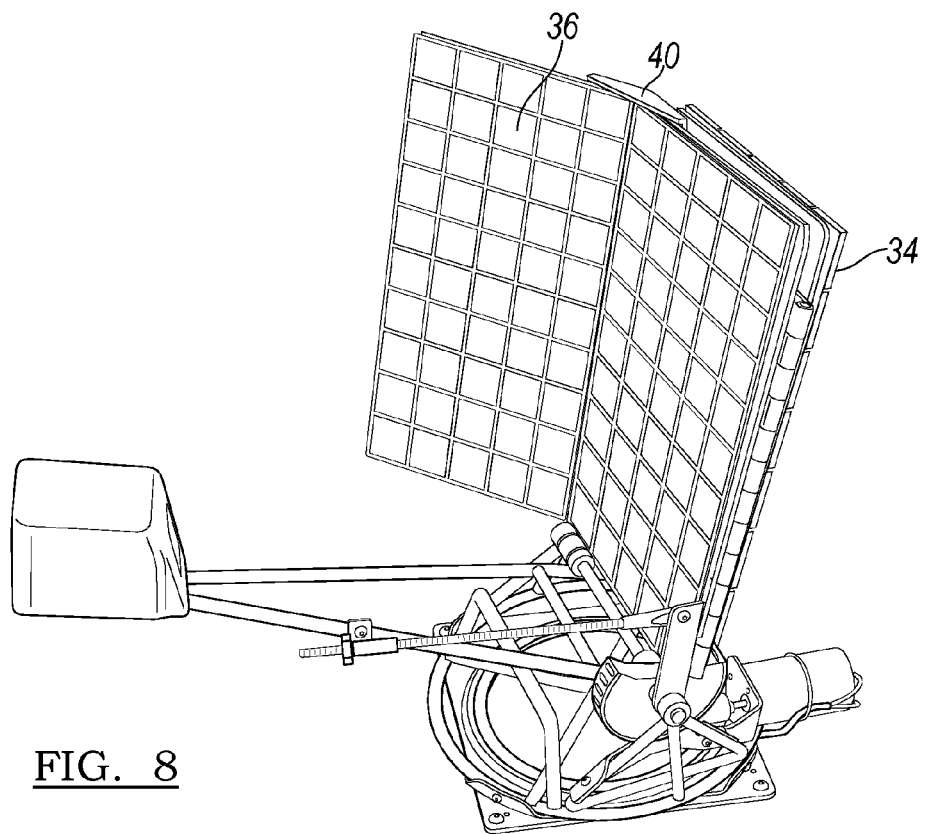
FIG. 8 is another side perspective view of the solar power collector of FIG. 1, illustrated in the extended position with a partially expanded reflective panel assembly.

FIG. 7 illustrates the solar collector 10 adjusted such that the panel assembly 24 is extended in a generally upright position. The end stop 86 of the strut 78 now contacts the strut bushing 84, such that further adjustment of the panel assembly 24, would also lift the collector assembly 26 to maintain their relative position. Once the solar collector 10 is extended and in the generally upright position, the panel assembly 24 is expanded by unfolding outer panels 34 and 36 as shown in FIGS. 1 and 8. The joints 40 are attached, fixing the position of the panels 28, 34 and 36 to each other. To collapse the solar collector 10 from the extended and expanded position as shown in FIG. 1 back to the collapsed position of FIG. 5, one would reverse the steps described above.

Figure 9:
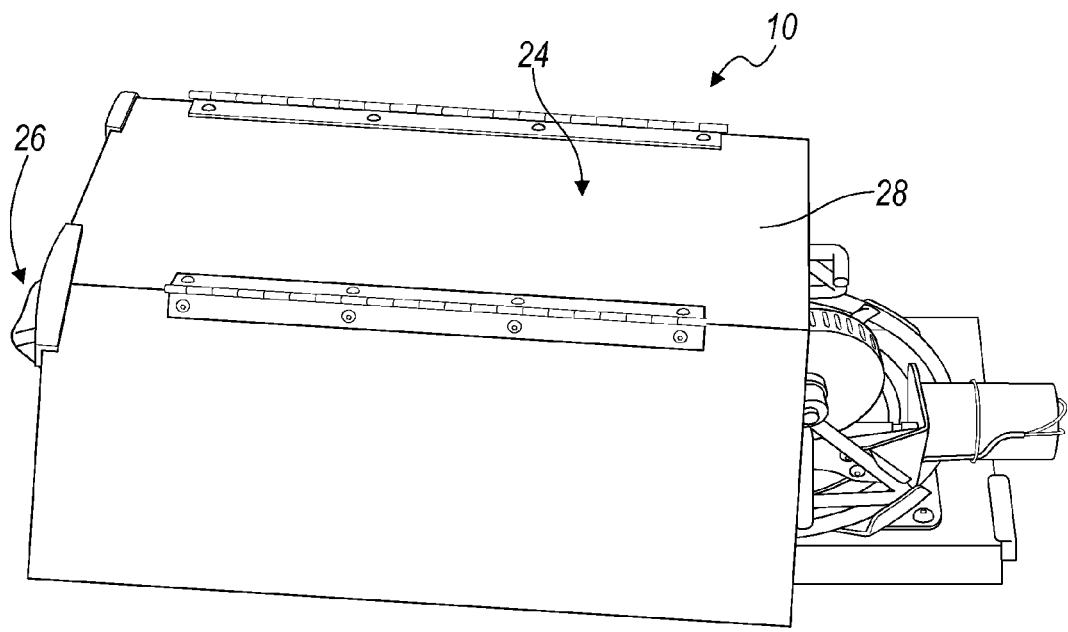
FIG. 9 is another side perspective view of the solar power collector of FIG. 1, illustrated in a stowed position.

In reference to FIG. 9, during periods of inclement weather or low available sunlight, the solar collector 10, may be adjusted to a stowed position. In the stowed position, the panel assembly 24 is pivoted towards the collector assembly 26, such that the central panel 28 is in a generally horizontal position. If high winds are detected, the solar collector 10, will first rotate such that collector assembly 26 points away from the wind, to prevent the solar collector 10 from tipping over. The stowed position of FIG. 9 is similar to the collapsed position of FIG. 5, with the exception being the panel assembly 24 is not folded upon itself.

The embodiment as depicted, includes manual adjustment to unfold the outer panels 34 and 36. The solar collector 10 is designed such that after initial set up, the user can leave it for extended periods of time, only returning periodically to clean the panel assembly 24. By adjusting to a stowed position at night or during inclement weather, the solar collector 10 can help keep the panel assembly 24 clean and extend the period of time between maintenance. Additionally, the panel assembly 24 is easier to access for cleaning or maintenance when the solar collector is in the stowed position.

Referring to FIGS. 1-3, the pitch actuator 66 and rotation actuator of the depicted embodiment include direct current motors that receive electrical power from the battery 72. However, alternate embodiments of the solar collector 10 include alternating current motors (not shown) for applications where alternating current is available.

Although the solar collector 10 of the depicted embodiment is described as a singular unit, another embodiment contemplates a system of solar collectors (not shown). A system of solar collectors can work together to generate more energy.

Another embodiment includes at least one solar collector 10 coupled to other energy conversion devices to complement each other, such as turbines or engines. One example of such an embodiment provides the solar collector 10 coupled to both a closed-cycle regenerative heat engine and a generator (not shown). A common example of such an engine is a "Stirling Engine". The engine would be positioned to receive the focused light from the panel assembly 24. The light would heat the engine, thereby compressing its internal gasses, which drive a mechanical output. The output of the engine would be mechanically coupled to a generator to create electricity. This electricity could be used to provide electric power directly to the actuators of the solar collector 10 or to charge the battery 72. Heat engines are known to radiate heat, therefore the absorber 52 could be positioned to capture and recycle some of this heat.

Alternative embodiments of the solar collector 10 include leveling systems (not shown) attached to the base 12. These leveling systems would function similar to those commonly used for recreational vehicles to maintain a level orientation of the base when the ground is uneven.

Figure 10:
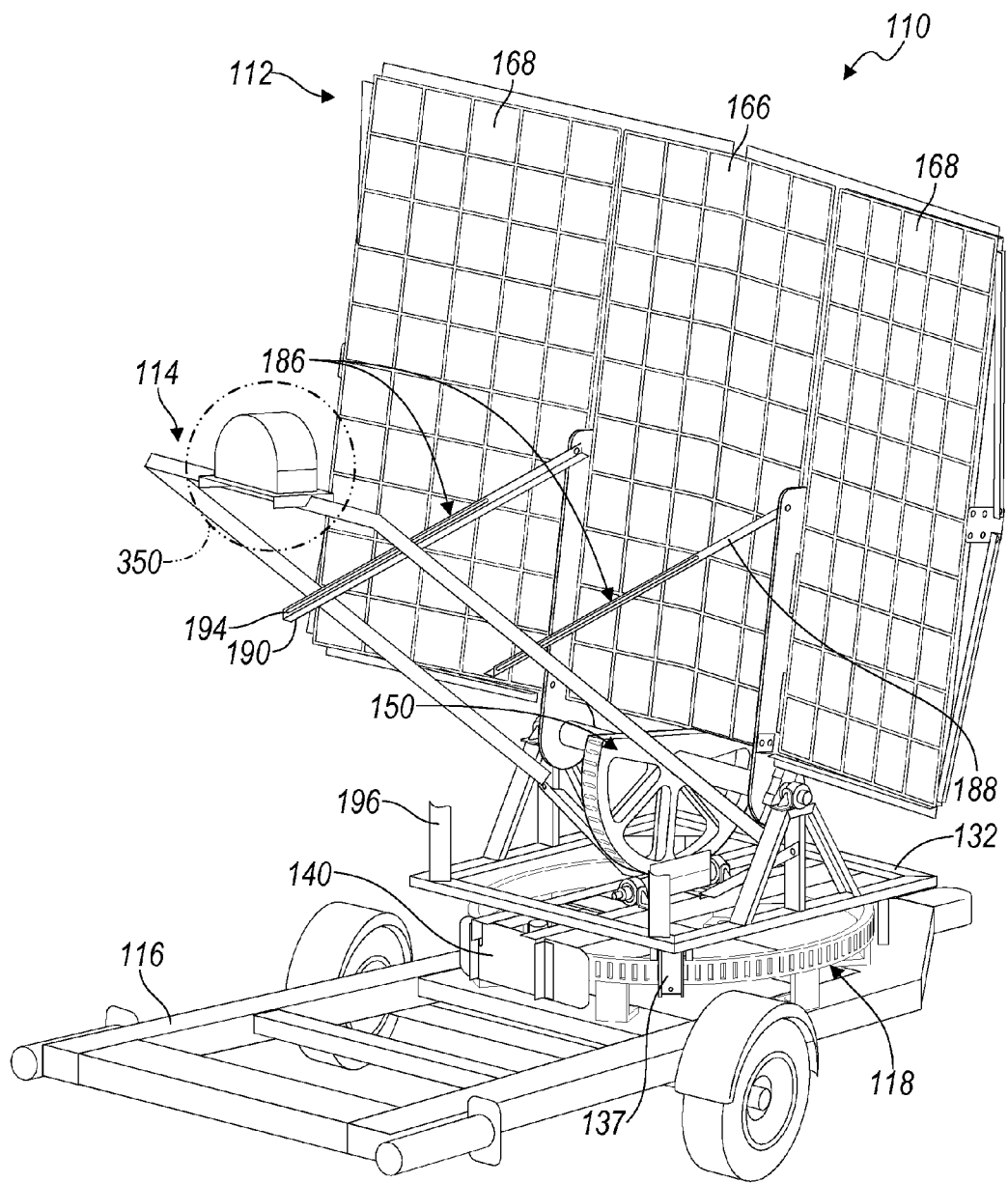
FIG. 10 is a front perspective view of another embodiment of the solar power collector, illustrated in an extended position with an expanded reflective panel assembly.

With reference to FIG. 10, a solar collector is illustrated in accordance with another embodiment of the present invention and is referenced generally by numeral 110. The solar collector 110 of the depicted embodiment includes different adjustment mechanisms than those depicted in the prior embodiments (FIGS. 1-9). In general, the solar collector 110 is provided for collecting energy from the sun. The solar collector 110 includes a reflective panel assembly 112 and a collector assembly 114 coupled together for receiving solar energy and using the energy for heating a fluid. Additionally, a trailer 116 is provided for transporting the solar collector 110.

Figure 11:
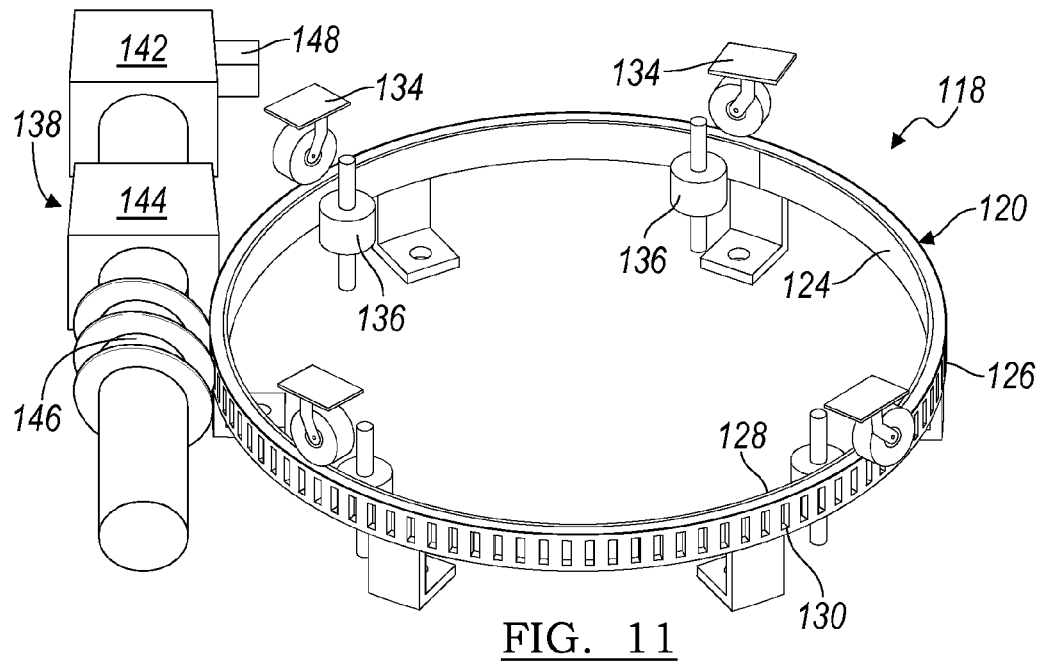
FIG. 11 is a front perspective view of a rotation gear assembly and a rotation actuator of the solar power collector of FIG. 10.

Referring to FIGS. 10 and 11, a rotation gear assembly 118 is provided for adjusting a rotational position of the panel assembly 112 and collector assembly 114 about a vertical axis (not shown). The rotation gear assembly 118 includes a gear wheel 120 and a bearing assembly 122 operatively coupled to one another.

The gear wheel 120 is mounted upon the trailer 116. The gear wheel 120 is mounted in a generally horizontal orientation. The gear wheel 120 includes a channeled tube 124, a slotted plate 126 and a rod 128 coupled to each other and formed into a ring. The channeled tube 124 is formed of an elongate partially enclosed tube. In one embodiment of the solar collector 110, the channeled tubing is formed of "C-Channel" tubing. The slotted plate 126 is formed of an elongate sheet of material. A series of slots 130 project through plate 126. The series of slots 130 are longitudinally spaced along a length of the plate 126. The slotted plate 126 is disposed over channeled tube 124, thereby forming an enclosed cavity within the tube 124. The slotted plate 126 is oriented about a circumference of the ring with the slots 130 facing outward. The slots 130 in the depicted embodiment act as gear teeth. The rod 128 is disposed upon an upper portion of the channeled tube 124 about a perimeter of the ring for engaging the bearing assembly 122. Other embodiments of the solar collector 10 envision a unitary gear wheel, (e.g., a die cast or molded gear wheel).

The bearing assembly 122 provides a low friction interface during rotational adjustment. The panel assembly 112 and collector assembly 114 are coupled to a frame 132. The bearing assembly 122 couples the frame 132 to the gear wheel 120. The bearing assembly 122 includes a series of casters 134 and a series of roller bearings 136 cooperating with each other. The casters 134 are mounted to an under surface of the frame 132 and support the frame 132 as it rides along the perimeter of the gear wheel 120. In one embodiment of the solar collector 110, the casters 134 engage the rod 128. The roller bearings 136 are mounted to the frame 132 and a bracket 137 which extends from the frame 132, and are configured for engaging an inner diameter of the gear wheel 120. The bracket 137 wraps around the outer diameter of the gear wheel 120, thereby helping to secure the frame 132 to the gear wheel 120 during high winds. The roller bearings 136 also help maintain a radial alignment of the frame 132 relative to the gear wheel 120.

A rotation actuator 138 engages the rotation gear assembly 118 for adjusting the rotational position of the panel assembly 112 and collector assembly 114. The rotation actuator 138 is mounted tangentially to the gear wheel 120, upon a plate 140 which extends downward from the frame 132. The rotation actuator 138 includes a rotation motor 142, a rotation reduction gear train 144 and a rotation worm 146 operatively coupled to one another. The rotation motor 142 may be an AC or DC motor, configured for receiving electrical power from a battery or AC power source (not shown) and converting it into mechanical rotational power. The reduction gear train 144 is coupled to the output of the motor 142. The reduction gear train 144 is sized for increasing the output torque of the motor 142. The rotation worm 146 is coupled to the output of the reduction gear train 144. The worm 146 is configured for meshing with the slotted plate 126 of the gear wheel 120. The worm 146 is also configured to be self-locking, such that torque applied to the worm 146 can not back drive the rotation motor 142. Additionally, a gear housing (not shown) may be provided for enclosing the worm 146 and preventing particles (e.g., dirt, debris) from collecting in the gear mesh.

The rotation actuator 138 includes a rotational position sensor 148 (e.g., a potentiometer, encoder, hall effect sensor, etc.) for indicating the position and/or speed of the rotation actuator 138, which corresponds to a position of the panel assembly 112. In one embodiment of the solar collector 110, an encoder is coupled to the motor 142 for measuring output angular travel. Alternate embodiments of the solar collector 110 envision a sensor coupled to the frame for indicating the angular position of the frame.

Figure 12:
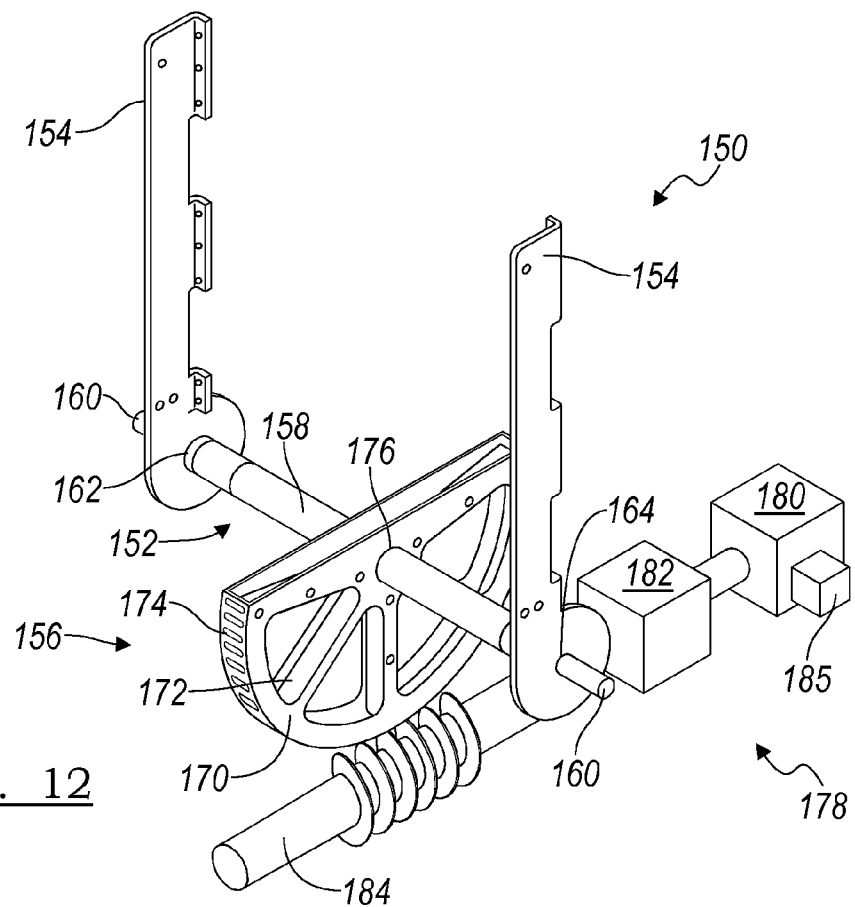
FIG. 12 is a front perspective view of an pitch gear assembly and a pitch actuator of the solar power collector of FIG. 10.

Referring to FIGS. 10-12, an pitch gear assembly 150 is provided for adjusting an elevation or pitch of the panel assembly 112 and the collector assembly 114 about a horizontal axis (not shown). The pitch gear assembly 150 includes a transverse axle 152 a pair of panel brackets 154 and a sector 156 coupled to each other. Additionally it is contemplated that the collector assembly 114 pivots about a second horizontal axis that is parallel to the horizontal axis of which the panel assembly 112 pivots.

The transverse axle 152 provides a horizontal axis for the panel assembly 112 and collector assembly 114 to pivot about. The transverse axle 152 includes a tube 158 and a pair of axlerods 160 coupled to one another. The axlerods 160 and the tube 158 are aligned coaxially, such that the axlerods 160 extend from opposing ends of the tube 158. The axlerods 160 have an outer diameter that is smaller than the outer diameter of the tube 158, thereby forming a shoulder 162.

The pair of panel brackets 154 extend from the transverse axle 152 for supporting the panel assembly 112. Each panel bracket 154 includes a rod aperture 164, for receiving an axlerod 160. The rod apertures 164 are sized smaller than the outer diameter of the tube 158, such that each panel bracket 154 abuts a corresponding shoulder 162. The panel brackets 154 are aligned with each other and fixed to the transverse axle 152. The panel assembly 112 includes a central panel 166 flanked by a pair of outer panels 168. The brackets 154 are coupled to opposing lateral edges of the central panel 166 and inner edges of both of the outer panels 168 for supporting the panel assembly 112.

The sector 156 receives mechanical power for adjusting the pitch of the panel assembly 112 and the collector assembly 114. The sector 156 includes a pair of partially circular gear plates 170, a series of ribs 172 and a slotted plate 174 coupled to each other. Each gear plate 170 includes a central aperture 176 sized for receiving the transverse axle 152. The series of ribs 172 are positioned between the gear plates 170 for connecting the plates 170 to each other. The ribs 172 radially extend from the central apertures 176. The slotted plate 174 is disposed over a curved portion of a perimeter of the gear plates 170, thereby further connecting the gear plates 170 to each other. The slotted plate 174 of the depicted embodiment acts as gear teeth. The sector 156 is axially aligned about a mid portion of a length of the transverse axle 152. The sector 156 is rotationally oriented about the transverse axle 152 such that a flat non geared/slotted portion of the sector 156 is perpendicular to a length of the brackets 154.

A pitch actuator 178 engages the pitch gear assembly 150 for adjusting the elevation or pitch of the panel assembly 112 and collector assembly 114. The pitch actuator 178 rotates the panel assembly 112 about the transverse axle 152. The pitch actuator 178 is mounted tangentially to the sector 156 at a central portion of the frame 132. The pitch actuator 178 includes a pitch motor 180, a pitch reduction gear train 182 and a pitch worm 184 operatively coupled to one another. The pitch motor 180 may be an AC or DC motor, configured for receiving electrical power from a battery or AC power source (not shown) and converting it into mechanical rotational power. The reduction gear train 182 is coupled to the output of the motor 180. The reduction gear train 182 is sized for increasing the output torque of the motor 180. The pitch worm 184 is coupled to the output of the reduction gear train 182. The worm 184 is configured for meshing with the slotted plate 174 of the sector 156. The worm 184 is also configured to be self-locking, such that torque applied to the worm 184 can not back drive the pitch motor 180. Additionally, a gear housing (not shown) may be provided for enclosing the worm 184 and preventing particles (e.g., dirt, debris) from collecting in the gear mesh.

The pitch actuator 178 includes a pitch sensor 185 (e.g., a potentiometer, encoder, hall effect sensor, etc.) for indicating the position and/or speed of the pitch actuator 178, which corresponds to a position (azimuth angle) of the panel assembly 112. In one embodiment of the solar collector 110, an encoder is coupled to the motor 180 for measuring output angular travel.

A pair of struts 186 are provided for coupling the collector assembly 114 to the panel assembly 112. A proximal end 188 of each strut 186 is pivotally connected to an upper portion of a corresponding panel bracket 154. The distal end 190 of each strut 186 is coupled to intermediate portions of the collector assembly 114.

Referring to FIGS. 10, 13 and 14, the pair of struts 186 provide a translational connection between the panel assembly 112 and the collector assembly 114. A pair of collector pins (not shown) extend inwardly from the intermediate portion of the collector assembly 114. A strut slot 192 is formed along the length of each strut 186. Each strut slot 192 is configured for receiving one of the collector pins. An end stop 194 formed in the distal end 190 of each slot 192 provides a reaction force against the collector pin for supporting the collector assembly 114. A pair of collector rests 196 contact the collector assembly 114 when the solar collector 110 is adjusted towards the collapsed position depicted in FIG. 13 or the stowed position depicted in FIG. 14. The collector assembly 114 stops adjusting/pivoting once it contacts the rests 196, however the panel assembly 112 continues to adjust/pivot. The strut slots 192 translate and pivot relative to the collector pins as the panel assembly continues to adjust and the panel assembly 112 collapses upon the collector assembly 114.

FIG. 14 illustrates the solar collector 110 with a panel support assembly 198 for supporting and maintaining the panel assembly 112 in an expanded position. The support assembly 198 includes lateral supports 200 and longitudinal supports 202 coupled to each other. A pair of lateral supports 200 each extend from the central panel 166 to an outer panel 168 for maintaining an obtuse angle between the adjacent panels 166, 168. A pair of longitudinal supports 202 and a support bracket 204 are coupled to each other for supporting each outer panel 168. The support bracket 204 extends transversely from an outer lateral edge of each outer panel 168. The pair of longitudinal supports 202 each extend from the support bracket 204 to opposite corners of the outer panel 168, thereby forming a truss for strengthening the panel assembly 112 for withstanding wind loading.

The panel assembly 112 includes hinges for pivotally coupling the outer panels 168 to the central panel 166. A series of hinges 206 allow a first outer panel 168' to fold over the central panel 166. A series of extended hinges 208, allow a second outer panel 168" to pivot about an axis that is offset from the central panel 166 such that the second outer panel 168" may fold over both the central panel 166 and the first outer panel 168'. Once the outer panels 168 are folded over the central panel 166 (FIG. 13) the panels may be secured to each other using the support bracket 204.

Alternate embodiments of the solar collector 110, envision a system for charging vehicles off the electric power grid. Many electric and hybrid electric vehicles include power cables for "plugging in" the vehicle when it is parked. A solar collector 110 or a series of solar collectors 110 may be positioned at parking lots for businesses (e.g., at the supermarket or at an apartment complex) for allowing a driver to charge their vehicle, without having to plug into the electrical power grid.

Another embodiment of the solar collector 110, envisions the solar collector 110, coupled to a portable tele-communication tower (not shown) for facilitating communication (e.g., cellular phone communication). The solar collector 110 may provide electrical power to the tower during initial set-up and during operation. Such a solar collector 110 could be utilized in a disaster area (e.g., post hurricane or flood sites).

An embodiment of the solar collector 110, includes individual panel adjustment mechanisms (not shown). The center and two side mirror panels are mounted in such a way that they can be independently aligned with respect to the tracking support and each other to make their reflected images coincident or adjacent to each other in the receiver plane. This is accomplished by providing adjustments at the panel mounting points for the center panel and mechanism to tilt the hinges on the side panels. These adjustments consist of shims or threaded adjustable linkages.

Referring to FIG. 10, additional embodiments of the solar collector 110 envision alternate receiver systems 350 for receiving reflected sunlight from the reflective panel assembly 112. These alternate receiver systems 350 may include a closed-cycle regenerative heat engine, steam turbine and photovoltaic (PV) receiver. Additionally the reflective panel assembly 112 may be configured specifically for each type of system 350.

One embodiment of the solar collector 110, includes a high concentration receiver system 350 having a closed-cycle regenerative heat engine. A Stirling Engine, such as that disclosed in U.S. Pat. No. 6,513,326 to Macenda et al., and assigned to Infinia Inc., which is herein incorporated by reference, may be utilized as the receiver system 350. This engine includes heat exchanging elements made from multiple platelets that are stacked and joined together, which allows for efficient heat transfer.

An embodiment of the panel assembly 112, which is coupled to the Stirling engine receiver system 350, provides a single point aiming strategy to heat the engine to an operating temperature of 800° C. The panel assembly 112 includes 2,400 (3"×3") facets to provide a peak flux of 2,400 Suns. The panel assembly 112 is configured to create a 4"×4" image on the engine, using a Gaussian flux distribution.

Another embodiment of the solar collector 110, includes a medium concentration steam turbine receiver system 350. In addition to the electricity generated from the turbine, the high temperature heat from the turbine exhaust may be used to process food or supply steam for industrial heating or cooling. For example a small Pelton Wheel turbine may be used. The steam turbine may be coupled to a feedwater pump, pressurized water receiver, and a flash boiling steam drum. A vapor-to-liquid steam condenser is provided to allow the waste heat to be sent to the industrial processes, to recycle the condensate, and to improve the performance of the system.

An embodiment of the panel assembly 112, which is coupled to the steam turbine receiver system 350, provides a single point aiming strategy to heat the turbine to an operating temperature of 550° C. The panel assembly 112 includes 1,350 (4"×4") facets to provide a peak flux of 1,350 Suns. The panel assembly 112 is configured to create a 5"×5" image on the turbine, using a Gaussian flux distribution.

Another embodiment of the solar collector 110, includes a PV receiver system 350 which provides a low concentration receiver. One embodiment of a PV receiver includes a reflecting Fresnal small mirror element as a primary optic, and Winston compound parabolic secondary optics. Another PV receiver, such as that disclosed in US. Patent Application Publication No. 2009/0114213 to McDonald et al. and assigned to SolFocus, Inc., which is herein incorporated by reference, may be utilized as the receiver system 350.

An embodiment of the panel assembly 112, which is coupled to the PV receiver system 350, provides a four point aiming strategy. The panel assembly 112 includes 338 (4"× 4") facets to provide a peak flux of 337 Suns. The panel assembly 112 is configured to create an 8"×8" image on the receiver, using a flat flux distribution.

Figure 15:
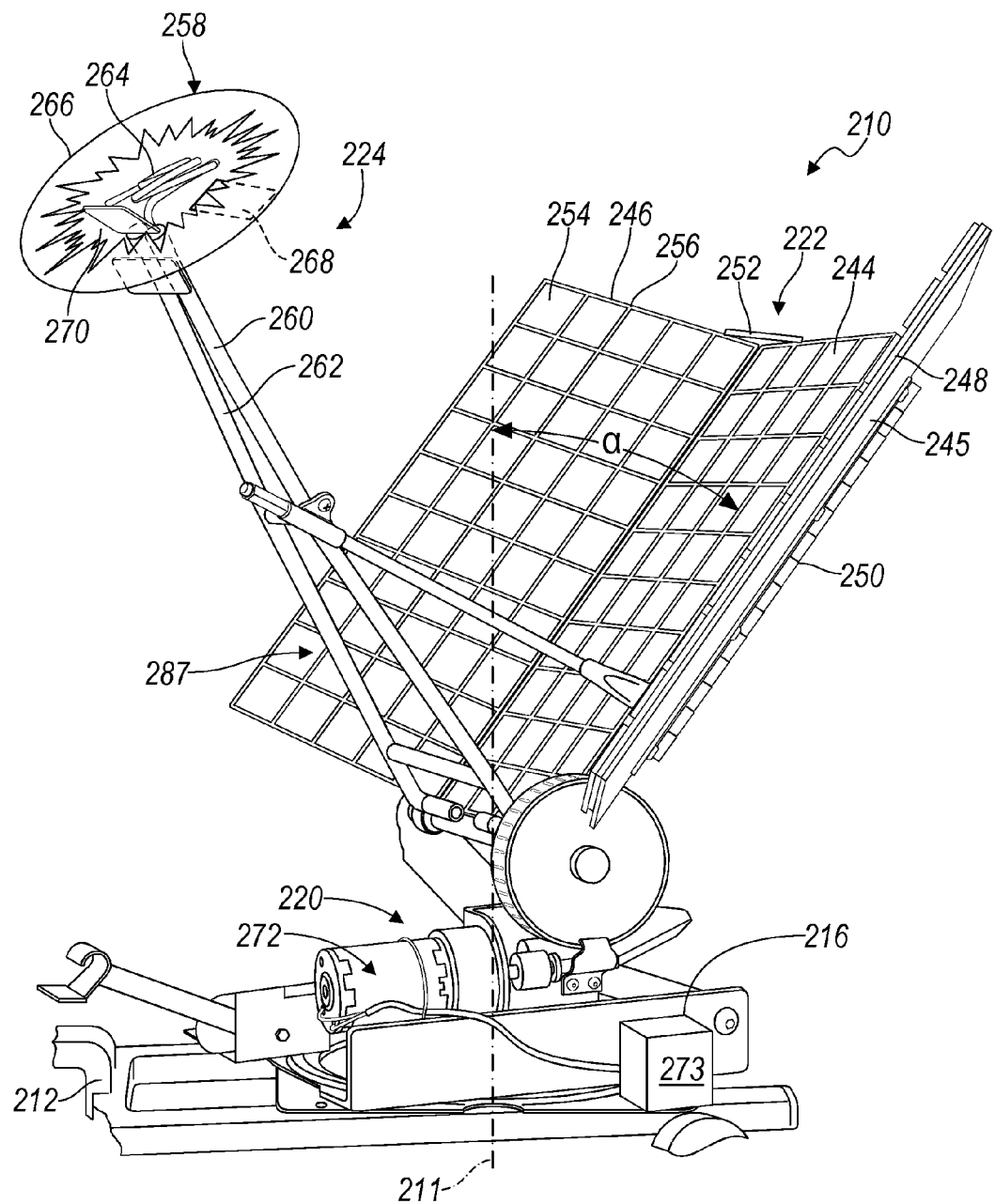
FIG. 15 is a side perspective view of another embodiment of the solar power collector, illustrated in an extended position with an expanded reflective panel assembly.

With reference to FIG. 15, a solar collector is illustrated in accordance with another embodiment of the present invention and is referenced generally by numeral 210. In general, the solar collector 210 is provided for collecting energy from the sun. The solar collector includes a reflective panel assembly 222 and a collector assembly 224 coupled together for receiving solar energy and using the energy for heating a fluid. The solar collector 210 also includes a four-bar linkage assembly 220 (shown disengaged) and a slider-crank mechanism 287 for supporting the panel assembly 222 and collector assembly 224 as they are adjusted. A frame 216 provides a base for the assemblies of the solar collector 210 to be mounted upon. The frame 216 may be attached to a trailer 212 for transporting the solar collector 210.

Referring to FIG. 15, the reflective panel assembly 222 shown in the depicted embodiment is generally provided for receiving solar energy and focusing the energy at a common focal point. The panel assembly 222 includes a central panel 244, that is operatively coupled to both a first outer panel 246 and a second outer panel 248. The three panels are generally of the same size. An embodiment of the solar collector 210, includes panels that are each generally ten feet wide and fifteen feet in length.

Each panel contains an array of reflective facets 254 that are organized in a tessellated pattern. A honeycomb structure 256 is provided for maintaining the position of the facets 254. Each facet 254 is oriented and embedded into a corresponding pocket of the structure 256. A back plate 245 is provided for supporting the structure 256 and facets 254 of each panel.

The back plate 245 of the central panel 244 includes a pair of hinges 250, mounted at the lateral edges of the panel 244. The hinges 250 connect the central panel 244 to each of the first outer panel 246 and the second outer panel 248. The hinges allow the panel assembly 222 to be folded upon itself, so that the solar collector 210 may collapse to a more compact overall shape.

FIG. 15 illustrates the panel assembly 222 in an expanded position. A pair of joints 252 lock the central panel 244 to each of the outer panels 246 and 248 for maintaining the expanded position. The two outer panels 246 and 248 are angled inward for focusing reflected light at the collector assembly 224.

An alternate embodiment of the reflective panel assembly 222 includes additional smaller reflective panels (not shown) extending from the existing panels 244, 246 and 248 to further expand the reflective panel assembly 222.

Another alternate embodiment of the reflective panel assembly, includes a plurality of curved petal shaped panels (not shown). Each panel is parabolic for focusing light on a receiver. In a closed position, the assembly collapses such that the individual panels partially overlap each other to form a generally spherical collapsed panel assembly. The panels extend, similar to the "blooming" of a flower to form a generally hemispherical open panel assembly.

An embodiment of the panel assembly is envisioned having a robot or other automation for attaching and orienting an array of facet assemblies to a back plate to form each panel (not shown). A facet sub-assembly includes a glass plate and a disc that are secured and oriented relative to one another by the robot. Each sub-assembly is oriented to a pre-determined position. A facet assembly includes the sub-assembly and a concave base that are secured and oriented relative to one another by the robot. The disc and base of the facet assembly, cooperate to provide an assortment of possible positions of the plate. Finally the robot secures each facet assembly to a predetermined location on the back plate, such that the array of facet assemblies are cooperatively aligned to focus reflected light at a common focal point.

Another embodiment of the facet assembly envisions, individual facet adjustment mechanisms (not shown). The adjustment mechanisms allow a user to re-orient a facet, if it becomes misaligned.

The collector assembly 224 includes a receiver 258 for receiving the reflected light from the panel assembly 222. The receiver 258 is supported by a pair of tubes, an inlet tube 260 and an outlet tube 262.

The receiver 258 includes a hollow generally spherical container 259 and an absorber 264. The container 259 substantially encapsulates the absorber 264, which limits the amount of heat radiated from the absorber 264 to the environment. The exterior wall 266 of the container 259 is generally opaque, thereby limiting the amount of sunlight that passes through the wall 266. The container 259 includes a window 268 that is positioned to allow reflected light to pass into the container 259 and focus on the absorber 264. The interior surface 270 of the receiver 258 may be painted or coated with a reflective texture to reflect light towards the absorber 264, once the light is within the container 259.

The absorber 264 connects the inlet tube 260 to the outlet tube 262. In general, fluid is heated by absorbed radiation as it circulates through the absorber 264. The absorber 264 includes a coiled tube that may be configured in a generally frusto-conical configuration, as illustrated in FIG. 15. Alternative embodiments of the solar collector 210 envision the tubing in other configurations such as serpentine, spherical or cylindrical. Additionally the absorber 264 may be painted or coated with a dark color to help absorb radiated heat from the sunlight.

Alternate embodiments of the solar collector 210 envision the window 268 having a lens (not shown) or an array of lenses to further focus the light on the absorber 264. An alternate embodiment of the collector assembly 224 includes a receiver that is generally hexahedronical in shape, and the exterior wall of the receiver may have multiple layers to provide additional insulation.

A fluid pump (not shown) is provided for circulating fluid through the collector assembly 224. The pump is connected to the inlet tube 260. The absorber 264 absorbs heat that is radiated by the reflected light. This heat is then transferred to the fluid circulating through the absorber 264 by convection. The heated fluid travels through the outlet tube 262 to a heat exchanger (not shown) for converting the heated fluid into other forms of energy.

The solar collector 210 adjusts to track the relative position of the sun, to optimize output energy. A pitch actuator 272 adjusts an azimuth angle $\alpha$ between the panel assembly 222 and a vertical axis 211. A rotation actuator 273 rotates the frame 216 and attached assemblies about the vertical axis 211. A gimbal assembly (not shown), such as that disclosed in PCT Published Application No. WO 2008/115964 to Polk, which is herein incorporated by reference, may be utilized to rotate the frame 216.

Figure 16:
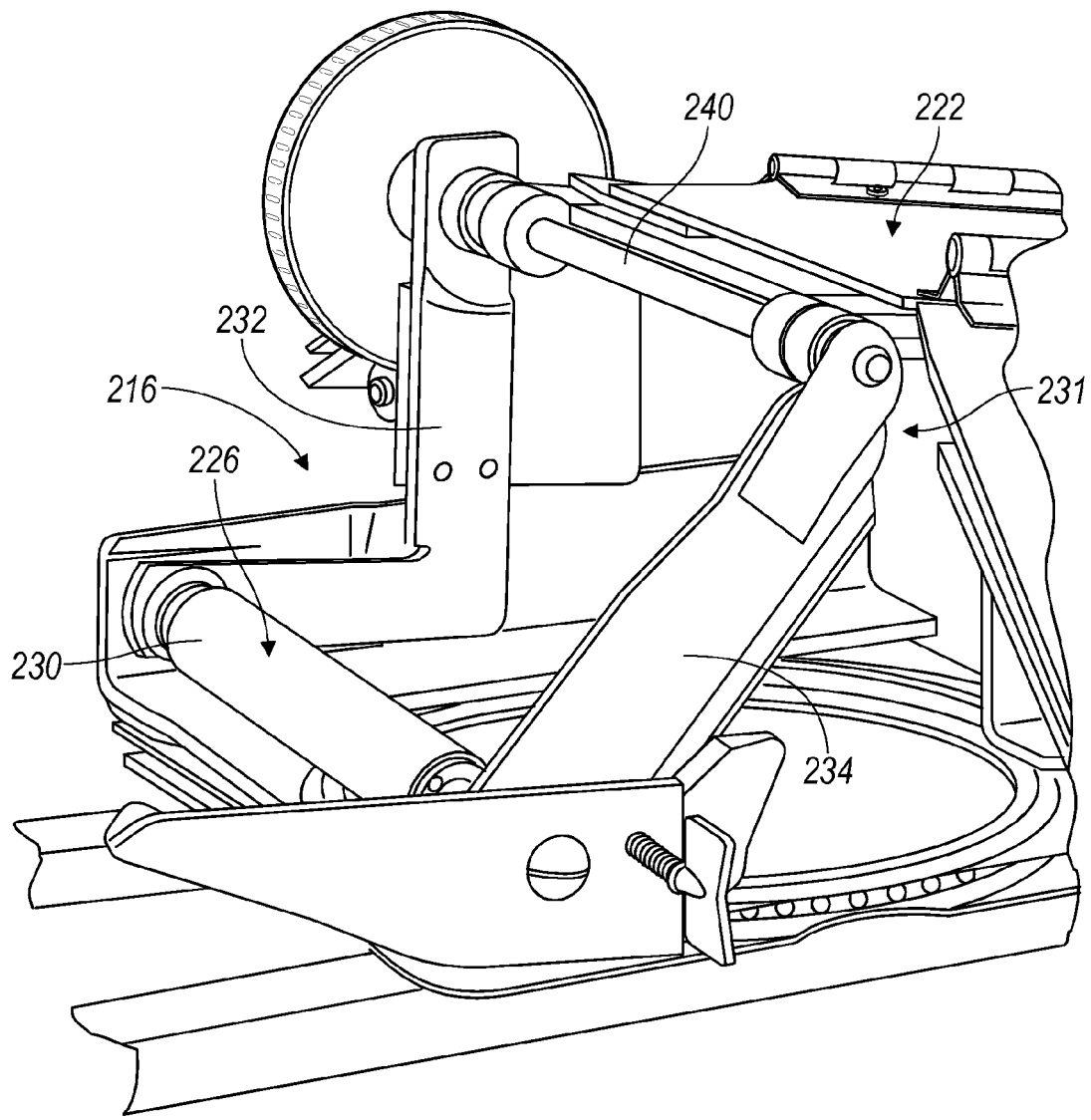
FIG. 16 is an enlarged rear perspective view of the solar power collector of FIG. 15, illustrated in a stowed position.

Referring to FIG. 16, the frame 216 includes a first transverse axle 226 and a second transverse axle 240, that are rigidly coupled to each other. The first transverse axle 226 is fixed to the frame 216 and provides a pivot for the panel assembly 222 and the collector assembly 224 (shown in FIG. 15). A sleeve 230 rotates about an external bearing surface provided by the first transverse axle 226. A pair of driven links 231, including a first link 232 and a second link 234, extend transversely from opposite ends of the sleeve 230. The second transverse axle 240 is secured by distal ends of the driven links 231. The second transverse axle 240 is coupled to and pivots about the first transverse axle 226 by the driven links 231. The panel assembly 222 is fixed to the second transverse axle 240, such that they pivot simultaneously.

Figure 17:
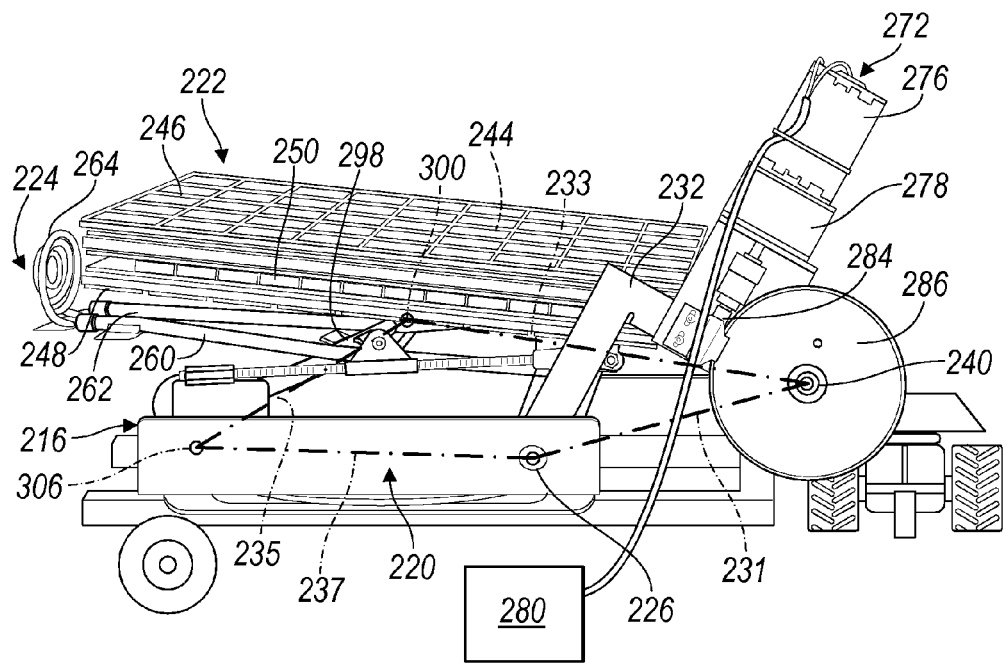
FIG. 17 is a side perspective view of the solar power collector of FIG. 15, illustrated in a forward position.

With reference to FIG. 17, a support 298 and brace 300 are coupled together for supporting the panel assembly 222 and collector assembly 224. The support 298 is pivotally connected to the frame 216 at post-pin 306. A brace 300, rigidly connects the inlet tube 260 to the outlet tube 262 of the collector assembly 224. The support 298 engages the brace 300 for supporting the panel assembly 222 and the collector assembly 224.

The four-bar linkage assembly 220 provides support for the panel assembly 222 and collector assembly 224 during adjustment. The pitch actuator 272 is fixed to the first link 232, of the driven links 231. As the pitch actuator 272 is energized, the driven links 231, pivot about the first transverse axle 226. An output link 233 is formed along the panel assembly 222, between the second transverse axle 240 and the brace 300. The output link 233 translates as the driven links 231 pivot. The support 298, acts as an idler link 235 that pivots about the post-pin 306 as the output link 233 translates. The frame 216 acts as an idler link 237, at an imaginary line between the post-pin 306 and the first transverse axle 226.

The pitch actuator 272 includes a DC motor 276. An electrical power source, such as a battery 280 provides electrical power to the motor 276. The actuator 272 includes a transmission 278, including an enclosed gear set (not shown) for adjusting the output power of the motor. The enclosed gear set may comprise: a spur, helical or planetary gear set. A worm 284 is provided as the output of the transmission 278. A gear 286 is fixed to the second transverse axle 240, whereby the axle 240 acts as an axis of rotation for the gear 286. The gear 286 meshes with the worm 284, forming a worm-gear set. As described above, the panel assembly 222 is fixed to the second transverse axle 240, thus the pitch actuator 272 is energized to pivot the panel assembly 222. Alternate embodiments of the solar collector are envisioned that include sensors to indicate the angular position of the panel assembly 222.

FIG. 17 illustrates the solar collector 210 of the depicted embodiment in a forward-collapsed position, whereby the second transverse axle 240 is positioned forward in vehicle of the first transverse axle 226. The solar collector 210 collapses into this position when it is transported. In this position, the two outer panels 246 and 248, are folded about their hinges 250, such that the three panels 244, 246 and 248 are stacked on top of each other. The inlet and outlet tubes 260 and 262, are longer than the length of the panel assembly 222, which allows the absorber 264 to be positioned beyond the panel assembly 222.

The center of mass of the panel assembly 222 combined with the collector assembly 224 is generally located above the fixed link 234, in the forward-collapsed position. The pitch actuator 272 is energized to create a torque about the second transverse axle 240 that is sufficient to translate the output link 233 rearward in vehicle, thereby pivoting the driven links 231 and idler link 235 in a generally counter clockwise direction.

Figure 18:
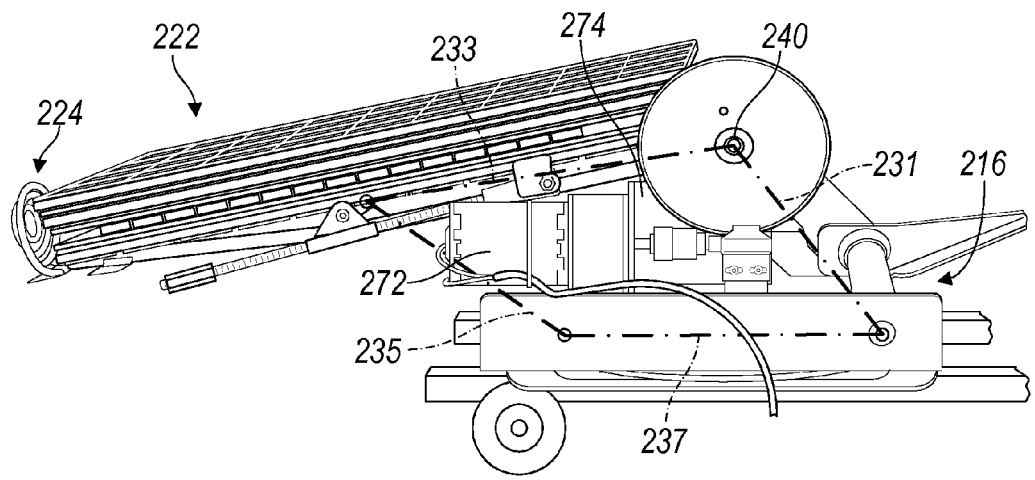
FIG. 18 is another side perspective view of the solar power collector of FIG. 15, illustrated in a rearward position.

FIG. 18, depicts the solar collector 210 in a rearward collapsed position. The actuator 272 is in a generally horizontal position and an actuator bracket 274 rests upon the frame 216. The contact between the actuator bracket 274 and the frame 216 prevents further rearward translation of the panel assembly 222 and collector assembly 224. The center of mass is now generally located rearward in vehicle of the fixed link 234. By further energizing the actuator 272 in the same direction, the torque about the second transverse axle 240 lifts the panel assembly 222 and collector assembly 224, pivoting them in a generally clockwise direction about the second transverse axle 240.

Figure 19:
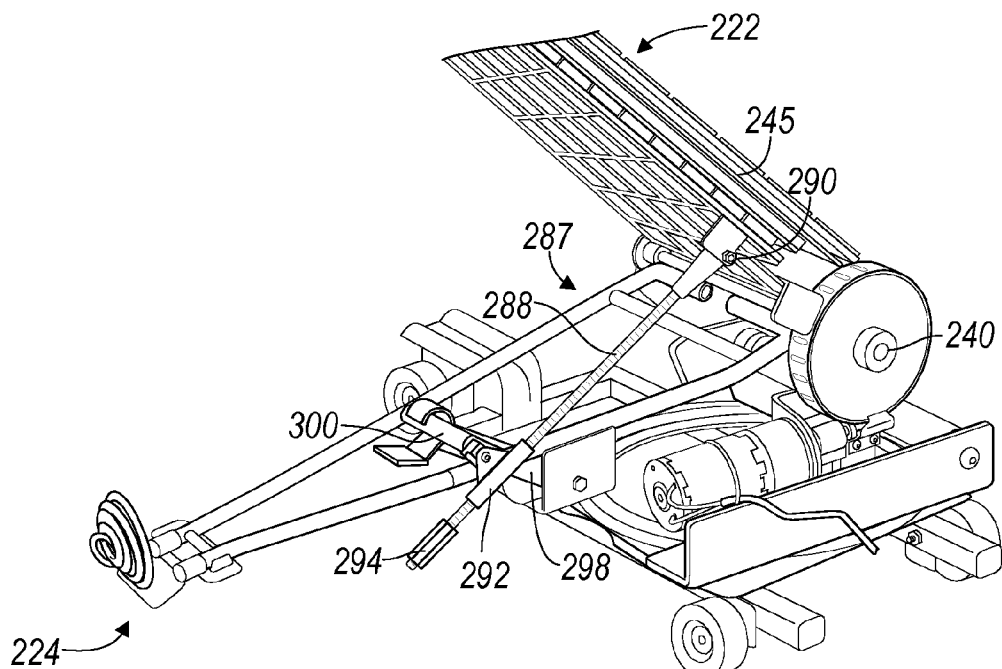
FIG. 19 is a front perspective view of the solar power collector of FIG. 15, illustrated in an intermediate position.
Figure 20:
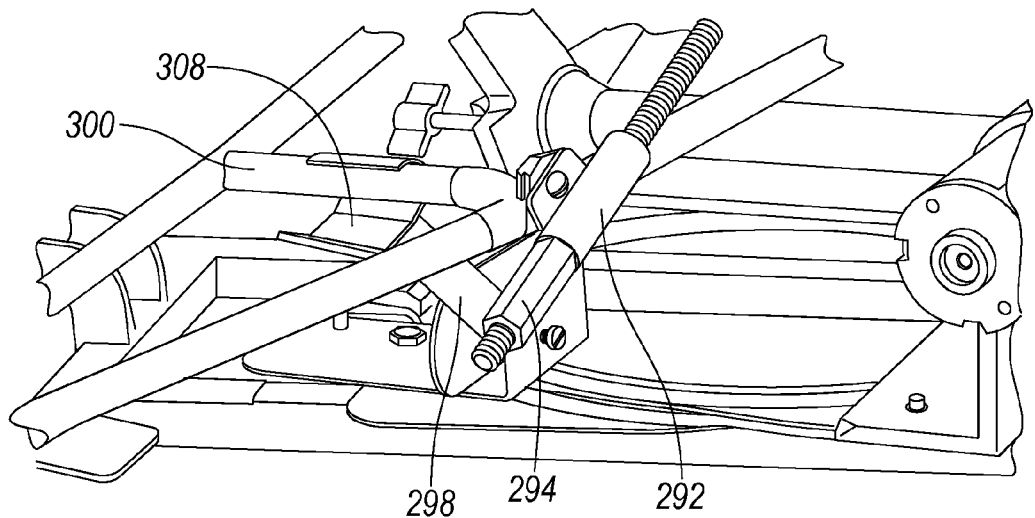
FIG. 20 is an enlarged front perspective view of the solar power collector of FIG. 19.

With reference to FIG. 19 and FIG. 20, a slider-crank mechanism 287 is provided for maintaining the position of the collector assembly 224 relative to the panel assembly 222. The slider-crank mechanism 287 includes a strut 288 that is pivotally connected to the panel assembly 222. A strut pin 290 is connected to a bracket that extends from the back plate 245. The pin 290 provides the pivotal connection for the strut 288. The slider-crank 287 includes a strut bushing 292 that is pivotally connected to the brace 300. As the panel assembly 222 pivots about the second transverse axle 240, the strut 288 axially translates/slides through the bushing 292. An end stop 294 is fixed to the distal end of the strut 288. Initial actuation of the pitch actuator 272 only pivots the panel assembly 222. The collector assembly 224 remains resting on the support 298 until end stop 294 of the strut 288 contacts the strut bushing 292 as shown in FIG. 20. Further extension of the panel assembly 222 will also lift the collector assembly 224, and both the collector assembly 224 and panel assembly 222 will pivot about the second transverse axle 240.

Figure 21:
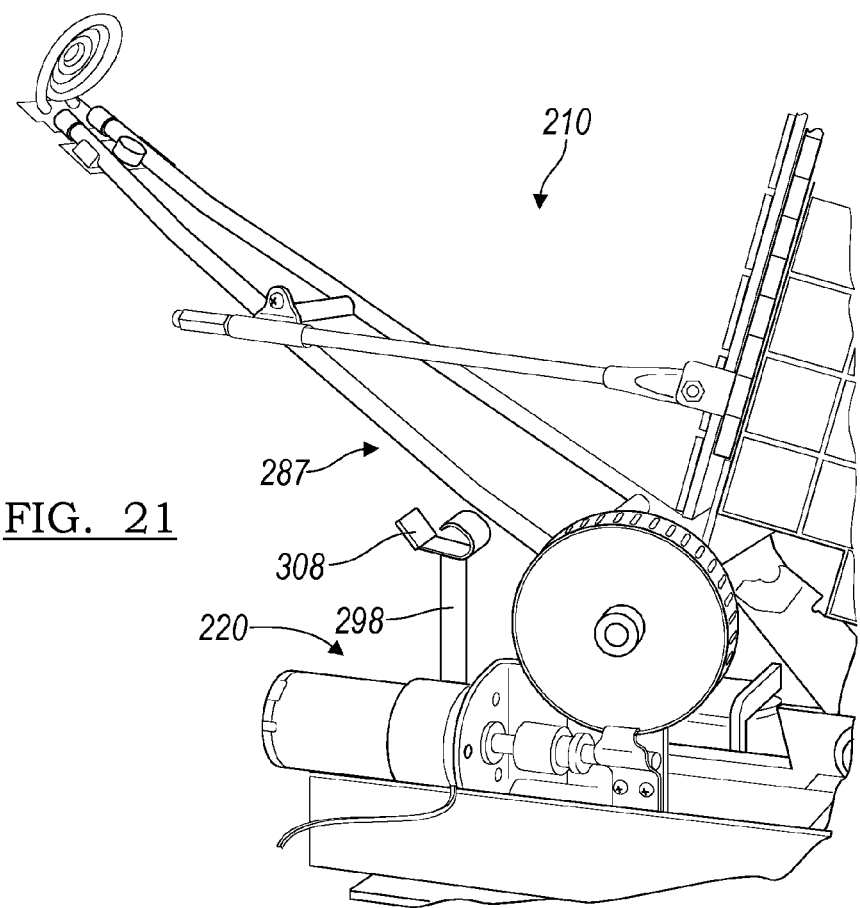
FIG. 21 is another side perspective view of the solar power collector of FIG. 15, illustrated in the extended position with a partially expanded reflective panel assembly.

Referring to FIG. 20 and FIG. 21 the support 298 and brace 300 disengage to allow full extension of the solar collector 210. A catch 308 is provided on the distal end of the support 298 for engaging the brace 300. The catch 308 acts as a bushing providing a bearing surface for the brace 300 to rotate in. As the support 298 pivots, the catch 308 disengages from the brace 300, thereby disengaging the linkage assembly 220. Thus the collector assembly 224 and the panel assembly 222 transition from being supported by the linkage assembly 220, to being supported by the slider-crank mechanism 287.

Figure 22:
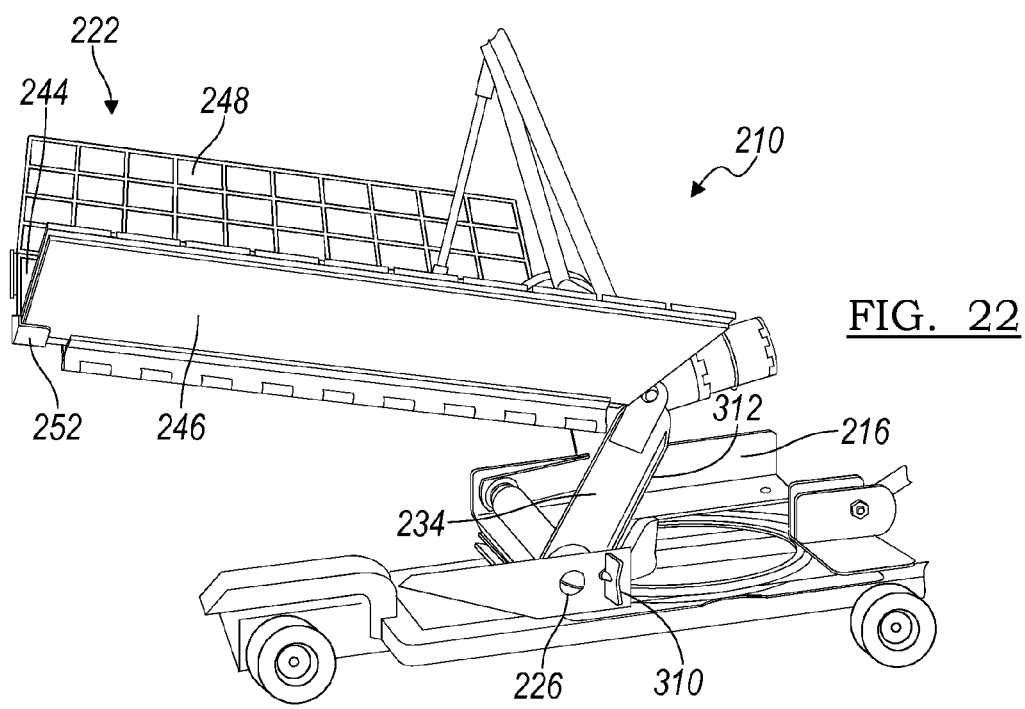
FIG. 22 is a rear perspective view of the solar power collector of FIG. 15, illustrated in an overextended position.

With reference to FIG. 22, the solar collector 210 is shown in an expanded and overextended position. The panel assembly 222 is expanded by unfolding outer panels 246 and 248 as shown in FIG. 15. The joints 252 are attached, fixing the position of the panels 244, 246 and 248 to each other. To collapse the solar collector 210 from the extended and expanded position, back to the collapsed position of FIG. 17, one would reverse the steps described above.

A stop pin 310 extends inward through the frame 216 and is positioned axially adjacent to the first transverse axle 226. The second link 234 includes a travel limiter 312, such as a flange. As the panel assembly 222 and collector assembly 224 are extended, the second link 234 and travel limiter 312 rotate about the second transverse axle 240. At the maximum extension position illustrated in FIG. 22, the stop pin 310 contacts the travel limiter 312 to prevent further extension. This prevents the solar collector 210 from extending to a position, from which it can not recover.

Figure 23:
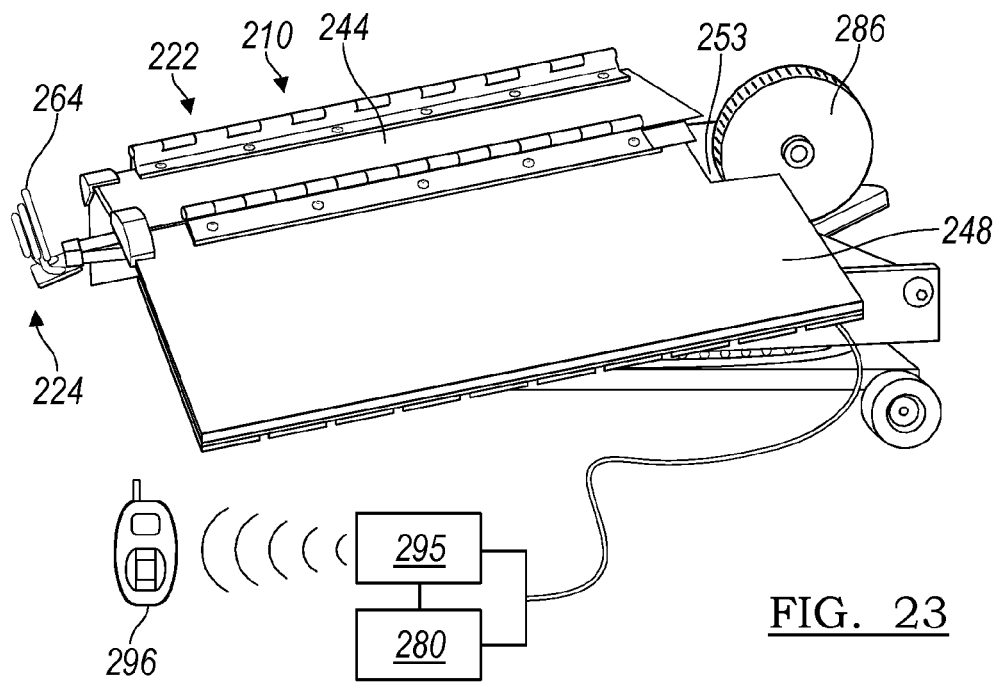
FIG. 23 is another side perspective view of the solar power collector of FIG. 15, illustrated in a stowed position.

In reference to FIG. 23, during periods of inclement weather or low available sunlight, the solar collector 210, may be adjusted to a stowed position. In the stowed position, the panel assembly 222 is pivoted towards the collector assembly 224, such that the central panel 244 is in a generally horizontal position. If high winds are detected, the solar collector 210, may first rotate such that collector assembly 224 points away from the wind, to prevent the solar collector 210 from tipping over. Alternatively, the solar collector 210 may rotate such that the panel assembly 222 is generally transversely aligned relative to the wind. The stowed position of FIG. 23 is similar to the collapsed position of FIG. 18, with the exception that the panel assembly 222 is not folded upon itself, in FIG. 23. A portion of the second panel 248 located along an inner proximal edge, may be removed to form a notch 253. The notch 253 provides clearance between the gear 286 and panel assembly 222 during adjustment.

The solar collector 210 includes a controller 295. The controller 295 uses an algorithm to determine the position of the sun relative to the current position of the solar collector 210. When the controller 295 determines that the solar collector 210 is not properly aligned with the sun, the controller communicates with both the pitch actuator 272 and the rotation actuator 273 (of FIG. 15), controlling them to adjust the solar collector 210 as needed to align with the sun. The algorithm may use the geographic position of the solar collector 210, along with the present date and time to calculate the position of the sun relative to the solar collector 210. Alternate embodiments envision the controller 295, communicating with sensors of the solar collector to determine the current position, for example sensors indicating the azimuth angle α and the angular position of the frame.

The solar collector 210 may also include a light sensor (not shown), and a wind speed sensor (not shown) for providing corresponding light and wind signals to the controller 295. The controller 295 may compare the light sensor signal against pre-determined data to confirm that the panel assembly 222 is oriented toward the sun. The controller 295 may also used the light signal to determine if there is insufficient sunlight. If there is insufficient sunlight the controller 295 may command the actuators 272 and 273 to adjust the solar collector 210 to a stow position. The controller 295 may compare the wind speed signal against pre-determined data to determine when a high wind condition is present. When the controller 295 determines a high wind condition is present, the controller 295 may command the actuators 272 and 273 to adjust the solar collector 210 to a stow position. For example, the controller 295 may first command the rotation actuator 273 to rotate the solar collector 210 such that the panel assembly is generally perpendicular to the direction of the wind, then command the pitch actuator 272 to lower the collector assembly 224 and the panel assembly 222, thereby reducing the wind forces acting against adjustment.

Figure 24:
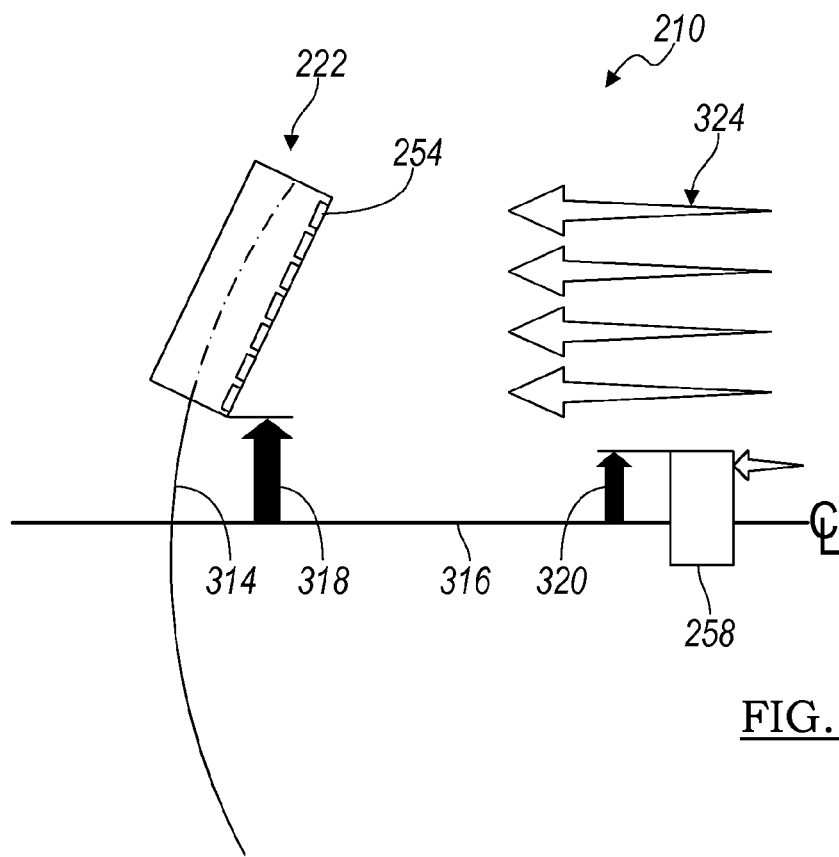
FIG. 24 is a schematic of another embodiment of the solar power collector, illustrating the position of a collector assembly.

With reference to FIG. 24, another embodiment of the solar collector 210 envisions orienting the panel assembly 222 and the collector assembly 224 so that the collector 224 does not block sunlight from reaching the panel assembly 222. Generally a smooth reflective dish that is parabolic in shape would reflect sunlight at a common focal point located along a centerline of the parabola. The solar collector 210 includes a panel assembly 222 that is generally planar, however the panels include many facets 254 that are each oriented along a section of a parabola 314 to focus the reflected sunlight at a common focal point, the receiver 258. The panel assembly 222 is offset 318 from a centerline 316 of the parabola 314. The offset 318 of the panel assembly 222 is greater than a height 320 of the receiver 258, therefore the receiver 258 does not block sunlight from reaching the panel assembly 222. This general principle allows for optimal efficiency of the solar collector 210.

Alternate embodiments of the solar collector 210 include alternating current motors (not shown) for applications where alternating current is available.

Another embodiment includes at least one solar collector 210 coupled to other energy conversion devices to complement each other, such as turbines or engines. One example of such an embodiment provides the solar collector 210 coupled to a closed-cycle regenerative heat engine (not shown). A common example of such an engine is a "Stirling Engine". The engine would be secured to the collector assembly to receive the focused light from the panel assembly. The light would heat the engine, thereby compressing its internal gasses, which would drive a mechanical output. Heat engines are known to radiate heat, therefore an absorber may be positioned to capture and recycle some of this heat. Another example of such an embodiment provides the solar collector coupled to a gas turbine engine, such as a "Brayton-type engine" (not shown). The turbine would receive the heated fluid from the solar collector and transfer the heat to a gas. The gas may drive a series of pistons, which are coupled to a mechanical output. The energy conversion devices, such as the closed-cycle regenerative heat engine or the gas turbine may be coupled to other systems such as electrical power generators, desalination systems or reverse osmosis systems. For systems having electrical power generators, the electricity may be used to provide electric power to the actuators of the solar collector.

Figure 25:
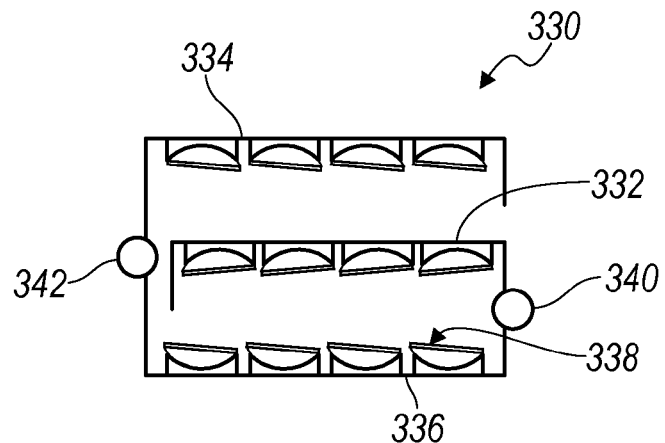
FIG. 25 is a schematic of another embodiment of the solar collector, illustrated with a reflective panel assembly in a closed position.
Figure 26:
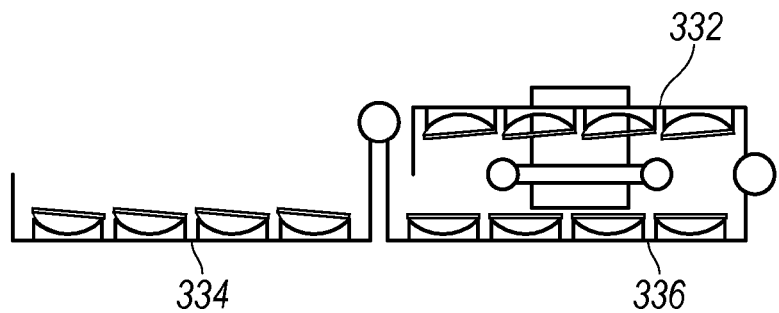
FIG. 26 is a schematic of the solar collector of FIG. 25, illustrated in a partially expanded position.
Figure 27:
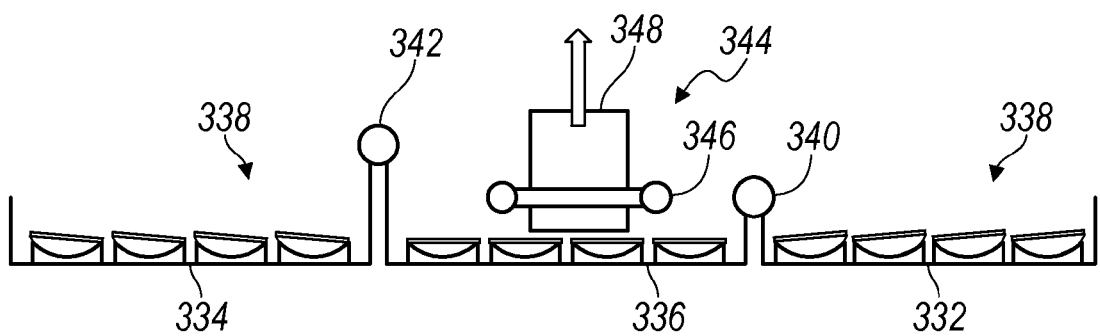
FIG. 27 is a schematic of the solar collector of FIG. 25, illustrated in an expanded position.

FIGS. 25-27 depict another embodiment of the solar collector, illustrating a reflective panel assembly 330 having an alternate folding configuration. The reflective panel assembly 330 includes a first outer panel 332 and a second outer panel 334 each pivotally coupled to a central panel 336. Reflective facets 338 are disposed over each panel 332, 334, and 336. A hinge 340 is provided for pivotally coupling the first outer panel 332 to the central panel 336, such that the reflective facets 338 of the first outer panel 332 are oriented to face the reflective facets 338 of the central panel 336 when folded. An extended hinge 342 is provided for pivotally coupling the second outer panel 334 to the central panel 336 about an axis that is offset from the central panel 336, such that the second outer panel 334 folds over the first outer panel 332. The reflective facets 338 of the second outer panel 334 are also oriented to face the reflective facets 338 of the central panel 336 when folded. The reflective facets 338 are all oriented inward for protecting the facets 338 from damage during transport. The solar collector of this embodiment also includes a collector assembly 344 capable of being partially enclosed by the panel assembly 330 during transport. The collector assembly 344 includes a support member 346 and a receiver 348 coupled to one another. The length of the support member 346 is longer than the length of each panel of the panel assembly 330. Therefore the panel assembly 330 folds to enclose the support member 346, however the receiver 348 is positioned beyond the panels.

FIG. 27 also illustrates the orientation of each facet 336. Each individual facet 336 is oriented to reflect sunlight at a common focal point, the receiver 348, when the solar collector is positioned in an extended position, with expanded reflective panel assembly 330.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A solar collector comprising:
   a base;
   a frame coupled to the base for rotating about a vertical axis;
   a reflective panel assembly supported by the frame and pivotal about a first horizontal axis relative to the frame and configured for reflecting sunlight to a common focal point, the panel assembly comprising:
   a central panel, and
   a pair of outer panels each pivotally coupled to opposing lateral edges of the central panel and configured for folding over the central panel;

a collector assembly mounted relative to the frame and pivotal about a second horizontal axis parallel to the first horizontal axis and configured for collecting solar energy, the collector assembly comprising:
  a receiver positioned adjacent the focal point and configured for extracting energy from the reflected sunlight, and
  at least one member for supporting the receiver and for facilitating energy communication through the receiver;
a rotation actuator mounted to the frame for rotating the reflective panel assembly and the collector assembly about the vertical axis;
a gear mounted upon the base for engaging the rotation actuator; and
a bearing assembly coupled to the frame for providing a low friction interface during rotational adjustment.

2. The solar collector according to claim 1 wherein the first horizontal axis and the second horizontal axis are coincident.

3. The solar collector according to claim 1 wherein the receiver further comprises an absorber having a coiled tube for circulating fluid therein while the fluid is heated by the focused sunlight.

4. The solar collector according to claim 2 further comprising:
  a pitch actuator mounted to the frame for pivoting the reflective panel assembly and the collector assembly about the horizontal axis.

5. The solar collector according to claim 1 wherein the gear further comprises:
  a channeled tube formed in a ring, the channeled tube having a cavity oriented about a circumference of the ring;
  a plate disposed over the cavity, the plate having a series of slots projecting therethrough; and
  a rod disposed upon an upper portion of the channeled tube for engaging the bearing assembly.

6. The solar collector according to claim 4 further comprising:
  a transverse axle oriented at the horizontal axis, the axle having a tube and a pair of axlerods coupled to one another, the axlerods extending coaxially from opposing ends of the tube, each axlerod having an outer diameter smaller than that of the tube, thereby forming a shoulder;
  at least one panel bracket extending transversely from the shoulder for supporting the panel assembly; and
  a sector gear extending transversely from an intermediate portion of the tube, the sector gear configured for engaging the pitch actuator.

7. The solar collector according to claim 6 wherein the sector gear further comprises:
  a pair of partially circular gear plates, each having a perimeter with a curved portion and a flat portion, each plate having a central aperture sized for receiving the transverse axle, the plates oriented axially adjacent and rotationally aligned to one another;
  a series of ribs positioned between the plates and oriented to radially extend from the central apertures, the ribs connecting the plates to one another; and
  a slotted plate disposed over the curved portion of the gear plates.

8. The solar collector according to claim 4 further comprising:
  a rotation sensor providing a rotation signal indicative of the angular position of the panel assembly and the collector assembly;
  a pitch sensor providing a pitch signal indicative of the azimuth angle of the panel assembly; and
  a controller configured to:
    receive the rotation signal and the pitch signal,
    compare each of the rotation signal and the pitch signal to predetermined data, and
    transmit a rotation command signal to the rotation actuator and a pitch command signal to the pitch actuator for adjusting the panel assembly and the collector assembly for tracking the sun.

9. The solar collector according to claim 8 further comprising a cell phone diagnostic system for communicating with the controller, whereby the system provides periodic checks of the solar collector for allowing the user to communicate with the solar collector remotely.

10. The solar collector according to claim 4 further comprising a four-bar linkage assembly and a slider-crank mechanism for supporting the panel assembly and the collector assembly as they are adjusted.

11. The solar collector according to claim 1 wherein the reflective panel assembly further comprises an array of reflective facets oriented in a tessellated pattern along the central panel and the pair of outer panels for reflecting sunlight to the common focal point.

12. The solar collector according to claim 11 wherein the outer panels are configured for folding over the central panel such that the reflective facets of both outer panels are oriented towards the central panel, thereby enclosing the reflective facets for protection during transport.

13. The solar collector according to claim 1 further comprising at least one strut providing a pivotal and translational connection between the collector assembly and the panel assembly, the at least one strut comprising:
  a proximal end pivotally connected to the panel assembly;
  an intermediate portion translationally coupled to the at least one member, such that the panel assembly may pivot independently of the collector assembly, while the intermediate portion slides relative to the collector assembly over a limited travel; and
  an end stop formed at a distal end of the strut, such that the end stop contacts the collector assembly at the end of the limited travel and provides a reaction force capable of supporting the collector assembly for pivoting with the panel assembly.

14. The solar collector according to claim 13 wherein the at least one member is longer than a length of the panel assembly, thereby positioning the receiver beyond the panel assembly when the solar collector is in a collapsed position.

15. The solar collector according to claim 14 wherein the pivotal connection of the panel assembly and the collector assembly has a range of travel that permits the central panel to collapse to a generally horizontal stowed position for periods of inclement weather or low available sunlight.

16. The solar collector according to claim 1 wherein the collector assembly further comprises: a closed-cycle regenerative heat engine positioned to receive the focused light from the panel assembly, the engine configured for driving a mechanical output; and a generator coupled to the mechanical output for generating electricity.

17. A solar collector comprising:
  a frame rotationally coupled to a base;
  a reflective panel assembly configured for reflecting sunlight to a focal point;
  a collector assembly pivotally coupled to the frame, and having a receiver positioned adjacent the focal point for receiving the reflected sunlight;

a four-bar linkage assembly for supporting the panel assembly and the collector assembly during movement between a generally flat collapsed position and a partially extended position, the four-bar linkage comprising:
a fixed link formed by the frame between a pin and a first transverse axle,
a pair of driven links pivotally connecting a second transverse axle to the first transverse axle,
an output link formed along the panel assembly between the second transverse axle and a brace, the output link configured for translating as the driven links pivot, and
an idler link formed by a support shaft pivotally coupled to the pin and engaging the brace, the idler link pivoting about the pin as the output link translates; and
a slider-crank mechanism comprising:
a strut pivotally connected to the panel assembly, the strut being received by a strut bushing pivotally connected to the brace such that the panel assembly may pivot independently of the collector assembly, while the strut slides within the bushing; and
an end stop formed at a distal end of the strut, such that the end stop contacts the strut bushing at the end of the limited travel and provides a reaction force capable of supporting the collector assembly for pivoting with the panel assembly, whereby further pivoting of the panel assembly disengages the four-bar linkage by decoupling the support shaft from the brace.

18. The solar collector according to claim 1 wherein the reflective panel assembly further comprises:
means for adjusting an aim point of each reflective panel in a dish focal plane, without affecting the aim point of the other reflective panels.

19. A solar collector comprising:
a base;
a frame coupled to the base for rotating about a vertical axis;
a reflective panel assembly supported by the frame and pivotal about a first horizontal axis relative to the frame and configured for reflecting sunlight to a common focal point, the panel assembly comprising:
a central panel, and
a pair of outer panels each pivotally coupled to opposing lateral edges of the central panel and configured for folding over the central panel;
a collector assembly mounted relative to the frame and pivotal about a second horizontal axis parallel to the first horizontal axis and configured for collecting solar energy, the collector assembly comprising:
a receiver positioned adjacent the focal point and configured for extracting energy from the reflected sunlight, and
at least one member for supporting the receiver and for facilitating energy communication through the receiver;
a pitch actuator mounted to the frame for pivoting the reflective panel assembly and the collector assembly about the first horizontal axis;
a transverse axle oriented at the first horizontal axis, the axle having a tube and a pair of axlerods coupled to one another, the axlerods extending coaxially from opposing ends of the tube, each axlerod having an outer diameter smaller than that of the tube, thereby forming a shoulder;
at least one panel bracket extending transversely from the shoulder for supporting the panel assembly; and
a sector gear extending transversely from an intermediate portion of the tube, the sector gear configured for engaging the pitch actuator.

* * * * *